United States Patent
Piao et al.

(10) Patent No.: US 10,257,538 B2
(45) Date of Patent: Apr. 9, 2019

(54) VIDEO ENCODING METHOD AND DEVICE INVOLVING INTRA PREDICTION, AND VIDEO DECODING METHOD AND DEVICE

(71) Applicant: SAMSUNG ELECTRONICS CO., LTD., Suwon-si (KR)

(72) Inventors: Yin-ji Piao, Yongin-si (KR); Sun-il Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 15/185,153

(22) Filed: Jun. 17, 2016

(65) Prior Publication Data

US 2016/0295237 A1  Oct. 6, 2016

Related U.S. Application Data

(63) Continuation of application No. PCT/KR2014/012572, filed on Dec. 19, 2014.
(Continued)

(51) Int. Cl.
*H04N 19/593* (2014.01)
*H04N 19/463* (2014.01)
(Continued)

(52) U.S. Cl.
CPC ........... *H04N 19/593* (2014.11); *H04N 19/11* (2014.11); *H04N 19/176* (2014.11); *H04N 19/463* (2014.11)

(58) Field of Classification Search
None
See application file for complete search history.

(56) References Cited

U.S. PATENT DOCUMENTS 9,578,329 B2   2/2017  Yang et al.
2011/0243229 A1  10/2011  Kim et al.
(Continued)

FOREIGN PATENT DOCUMENTS

EP   2728872 A2   5/2014
JP   2006-005438 A   1/2006
(Continued)

OTHER PUBLICATIONS

Search Report dated Mar. 19, 2015, issued by the International Searching Authority in counterpart International Patent Application No. PCT/KR2014/012572 (PCT/ISA/210).
(Continued)

*Primary Examiner* — James M Anderson, II
(74) *Attorney, Agent, or Firm* — Sughrue Mion, PLLC

(57) ABSTRACT

Provided is a video decoding method including determining a reference intra prediction mode, based on availability and a prediction mode of an adjacent block of a current block; determining a plurality of candidate intra prediction modes for the current block, based on the reference intra prediction mode; obtaining, from a bitstream, intra prediction data comprising information regarding an intra prediction mode of the current block; when the intra prediction data indicates that the current block is predicted according to one of the plurality of candidate intra prediction modes, selecting an intra prediction mode to be used in intra predicting the current block, wherein the intra prediction mode is from among the plurality of candidate intra prediction modes; and performing intra prediction on the current block, according to the selected intra prediction mode.

7 Claims, 15 Drawing Sheets

Related U.S. Application Data

(60) Provisional application No. 61/918,151, filed on Dec. 19, 2013.

(51) Int. Cl.
    *H04N 19/176*     (2014.01)
    *H04N 19/11*     (2014.01)

(56) References Cited

U.S. PATENT DOCUMENTS

| | | |
|---|---|---|
| 2014/0133558 A1 | 5/2014 | Seregin et al. |
| 2014/0153646 A1 | 6/2014 | Yang et al. |
| 2014/0185675 A1 | 7/2014 | Kim et al. |

FOREIGN PATENT DOCUMENTS

| | | | | |
|---|---|---|---|---|
| KR | 10-2010-0033676 A | 3/2010 | | |
| KR | 10-2013-0002286 A | 1/2013 | | |
| KR | 10-2013-0004548 A | 1/2013 | | |
| KR | 20130002286 A * | 1/2013 | ........... | H04N 19/105 |
| TW | 201309041 A1 | 2/2013 | | |
| WO | 2013/085282 A1 | 6/2013 | | |
| WO | WO 2013085282 A1 * | 6/2013 | ........... | H04N 19/176 |

OTHER PUBLICATIONS

Written Opinion dated Mar. 19, 2015, issued by the International Searching Authority in counterpart International Patent Application No. PCT/KR2014/012572 (PCT/ISA/237).

Communication dated Aug. 15, 2018, from the State Intellectual Property Office of People's Republic of China in counterpart Application No. 201480075994.1.

\* cited by examiner

CODING UNIT (1010)

VIDEO ENCODING METHOD AND DEVICE INVOLVING INTRA PREDICTION, AND VIDEO DECODING METHOD AND DEVICE

CROSS REFERENCE TO RELATED APPLICATIONS

This application is a continuation of International Patent Application No. PCT/KR2014/012572 filed on Dec. 19, 2014, which claims the benefit of U.S. Provisional Application No. 61/918,151 filed Dec. 19, 2013, the contents of which are incorporated herein in their entirety by reference.

TECHNICAL FIELD

The present invention relates to encoding and decoding a video by using intra prediction.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a coding unit having a predetermined size.

Image data of a spatial domain is transformed into coefficients of a frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared to image data of the spatial domain, coefficients of the frequency domain are easily compressed. In particular, since an image pixel value of the spatial domain is expressed according to a prediction error via inter prediction or intra prediction of the video codec, when frequency transformation is performed on the prediction error, a large amount of data may be transformed to 0. According to the video codec, an amount of data may be reduced by replacing data that is consecutively and repeatedly generated with small-sized data.

DETAILED DESCRIPTION OF THE INVENTION

Technical Problem

Provided is a method of encoding information regarding an intra prediction mode of a current block, in which an intra prediction mode having high availability with respect to being used in intra prediction is determined as a candidate intra prediction mode. Also, provided is a method of decoding the information regarding the intra prediction mode of the current block, in which the intra prediction mode having high availability with respect to being used in the intra prediction is determined as the candidate intra prediction mode. Also, provided is a computer-readable recording medium having recorded thereon a program including the encoding method or decoding method.

Technical Solution

According to an aspect of the present invention, there is provided a video decoding method including determining a reference intra prediction mode, based on availability and a prediction mode of an adjacent block of a current block; determining a plurality of candidate intra prediction modes for the current block, based on the reference intra prediction mode; obtaining, from a bitstream, intra prediction data including information regarding an intra prediction mode of the current block; when the intra prediction data indicates that the current block is predicted according to one of the plurality of candidate intra prediction modes, selecting an intra prediction mode to be used in intra predicting the current block, wherein the intra prediction mode is from among the plurality of candidate intra prediction modes; and performing intra prediction on the current block, according to the selected intra prediction mode.

The reference intra prediction mode may include a first reference intra prediction mode and a second reference intra prediction mode, wherein the first reference intra prediction mode is determined based on availability and a prediction mode of a left adjacent block of the current block, and the second reference intra prediction mode is determined based on availability and a prediction mode of an above adjacent block of the current block, and the determining of the reference intra prediction mode may include, when the left adjacent block of the current block is not present or the left adjacent block of the current block is predicted based on inter prediction, determining the first reference intra prediction mode as a first default intra prediction mode, when the left adjacent block of the current block is predicted based on intra prediction, determining the first reference intra prediction mode as an intra prediction mode used in intra predicting the left adjacent block of the current block, when the above adjacent block of the current block is not present or the above adjacent block of the current block is predicted based on inter prediction, determining the second reference intra prediction mode as the first default intra prediction mode, and when the above adjacent block of the current block is predicted based on intra prediction, determining the second reference intra prediction mode as an intra prediction mode used in intra predicting the above adjacent block of the current block.

When the first reference intra prediction mode and the second reference intra prediction mode are the same, and the first reference intra prediction mode does not indicate the first default intra prediction mode, the determining of the plurality of candidate intra prediction modes may include determining a first candidate intra prediction mode as the first default intra prediction mode, and determining a second candidate intra prediction mode as the first reference intra prediction mode.

When the first reference intra prediction mode and the second reference intra prediction mode are the same, and the first reference intra prediction mode may indicate the first default intra prediction mode, the determining of the plurality of candidate intra prediction modes may include determining a first candidate intra prediction mode as the first default intra prediction mode, and determining a second candidate intra prediction mode as a second default intra prediction mode.

When the first reference intra prediction mode and the second reference intra prediction mode are different, the determining of the plurality of candidate intra prediction modes may include determining a first candidate intra prediction mode as an intra prediction mode having a smaller index value between the first reference intra prediction mode and the second reference intra prediction mode, and determining a second candidate intra prediction mode as an intra prediction mode having a larger index value between the first reference intra prediction mode and the second reference intra prediction mode.

The video decoding method may further include, when the intra prediction data indicates that the current block is predicted based on one of intra prediction modes that are not included in the plurality of candidate intra prediction modes, selecting an intra prediction mode to be used in intra predicting the current block, based on an index value of the intra prediction data and index values of the plurality of candidate intra prediction modes.

The selecting of the intra prediction mode may include, when a value obtained by subtracting 2 from an index value of the intra prediction data is less than an index value representing the first candidate intra prediction mode, determining the intra prediction mode of the current block as an intra prediction mode corresponding to the value obtained by subtracting 2 from the index value of the intra prediction data; when the value obtained by subtracting 2 from the index value of the intra prediction data is greater than the index value representing the first candidate intra prediction mode and is less than an index value representing the second candidate intra prediction mode, determining the intra prediction mode of the current block as an intra prediction mode corresponding to a value obtained by subtracting 1 from the index value of the intra prediction data; and when the value obtained by subtracting 2 from the index value of the intra prediction data is greater than the index value representing the second candidate intra prediction mode, determining the intra prediction mode of the current block as an intra prediction mode corresponding to the index value of the intra prediction data.

According to another aspect of the present invention, there is provided a video decoding apparatus including a candidate intra prediction mode determiner configured to determine a reference intra prediction mode, based on availability and a prediction mode of an adjacent block of a current block, and determine a plurality of candidate intra prediction modes for the current block, based on the reference intra prediction mode; and an intra predictor configured to obtain, from a bitstream, intra prediction data including information regarding an intra prediction mode of the current block, when the intra prediction data indicates that the current block is predicted according to one of the plurality of candidate intra prediction modes, select an intra prediction mode to be used in intra predicting the current block, wherein the intra prediction mode is from among the plurality of candidate intra prediction modes, and perform intra prediction on the current block, according to the selected intra prediction mode.

The reference intra prediction mode may include a first reference intra prediction mode and a second reference intra prediction mode, wherein the first reference intra prediction mode is determined based on availability and a prediction mode of a left adjacent block of the current block, and the second reference intra prediction mode is determined based on availability and a prediction mode of an above adjacent block of the current block, and the candidate intra prediction mode determiner may be further configured to, when the left adjacent block of the current block is not present or the left adjacent block of the current block is predicted based on inter prediction, determine the first reference intra prediction mode as a first default intra prediction mode, when the left adjacent block of the current block is predicted based on intra prediction, determine the first reference intra prediction mode as an intra prediction mode used in intra predicting the left adjacent block of the current block, when the above adjacent block of the current block is not present or the above adjacent block of the current block is predicted based on inter prediction, determine the second reference intra prediction mode as the first default intra prediction mode, and when the above adjacent block of the current block is predicted based on intra prediction, determine the second reference intra prediction mode as an intra prediction mode used in intra predicting the above adjacent block of the current block.

When the first reference intra prediction mode and the second reference intra prediction mode are the same, and the first reference intra prediction mode does not indicate the first default intra prediction mode, the candidate intra prediction mode determiner may be further configured to determine a first candidate intra prediction mode as the first default intra prediction mode, and to determine a second candidate intra prediction mode as the first reference intra prediction mode.

When the first reference intra prediction mode and the second reference intra prediction mode are the same, and the first reference intra prediction mode may indicate the first default intra prediction mode, the candidate intra prediction mode determiner may be further configured to determine a first candidate intra prediction mode as the first default intra prediction mode, and to determine a second candidate intra prediction mode as a second default intra prediction mode.

When the first reference intra prediction mode and the second reference intra prediction mode are different, the candidate intra prediction mode determiner may be further configured to determine a first candidate intra prediction mode as an intra prediction mode having a smaller index value between the first reference intra prediction mode and the second reference intra prediction mode, and determine a second candidate intra prediction mode as an intra prediction mode having a larger index value between the first reference intra prediction mode and the second reference intra prediction mode.

When the intra prediction data indicates that the current block is predicted based on one of intra prediction modes that are not included in the plurality of candidate intra prediction modes, the intra predictor may be further configured to select an intra prediction mode to be used in intra predicting the current block, based on an index value of the intra prediction data and index values of the plurality of candidate intra prediction modes.

The intra predictor may be further configured to, when a value obtained by subtracting 2 from an index value of the intra prediction data is less than an index value representing the first candidate intra prediction mode, determine the intra prediction mode of the current block as an intra prediction mode corresponding to the value obtained by subtracting 2 from the index value of the intra prediction data; when the value obtained by subtracting 2 from the index value of the intra prediction data is greater than the index value representing the first candidate intra prediction mode and is less than an index value representing the second candidate intra prediction mode, determine the intra prediction mode of the current block as an intra prediction mode corresponding to a value obtained by subtracting 1 from the index value of the intra prediction data; and when the value obtained by subtracting 2 from the index value of the intra prediction data is greater than the index value representing the second candidate intra prediction mode, determine the intra prediction mode of the current block as an intra prediction mode corresponding to the index value of the intra prediction data.

According to another aspect of the present invention, there is provided a video encoding method including determining a reference intra prediction mode, based on availability and a prediction mode of an adjacent block of a current block; determining a plurality of candidate intra prediction modes for the current block, based on the reference intra prediction mode; and based on an intra prediction mode used for the current block and the plurality of candidate intra prediction modes, determining whether the current block is predicted according to one of the plurality of candidate intra prediction modes, and intra prediction data indicating the intra prediction mode used for the current block.

According to another aspect of the present invention, there is provided a video encoding apparatus including a candidate intra prediction mode determiner configured to determine a reference intra prediction mode, based on availability and a prediction mode of an adjacent block of a current block, and determine a plurality of candidate intra prediction modes for the current block, based on the reference intra prediction mode; and an intra prediction mode information encoder configured to, based on an intra prediction mode used for the current block and the plurality of candidate intra prediction modes, determine whether the current block is predicted according to one of the plurality of candidate intra prediction modes, and intra prediction data indicating the intra prediction mode used for the current block.

According to another aspect of the present invention, there is provided a computer-readable recording medium having recorded thereon a program for executing the video decoding method, by using a computer.

According to another aspect of the present invention, there is provided a computer-readable recording medium having recorded thereon a program for executing the video encoding method, by using a computer.

Advantageous Effects of the Invention

An intra prediction mode having high availability with respect to being used in intra predicting a current block may be determined as a candidate intra prediction mode, and information regarding the candidate intra prediction mode may be entropy encoded as a short binary symbol string. Therefore, information regarding an intra prediction mode of the current block may be efficiently compressed.

BEST MODE

Figure 1:
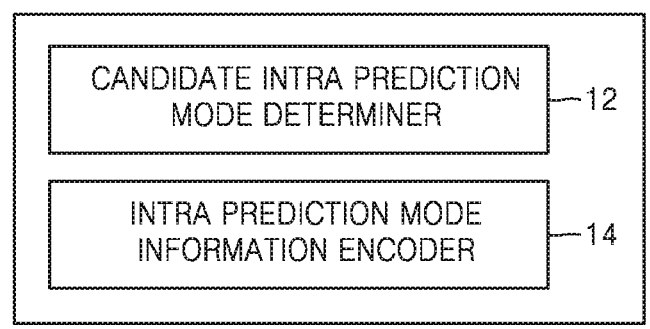
FIG. 1 shows a block diagram of a video encoding apparatus, according to an embodiment of the present invention.

According to an aspect of the present invention, there is provided a video decoding method including determining a reference intra prediction mode, based on availability and a prediction mode of an adjacent block of a current block; determining a plurality of candidate intra prediction modes for the current block, based on the reference intra prediction mode; obtaining, from a bitstream, intra prediction data including information regarding an intra prediction mode of the current block; when the intra prediction data indicates that the current block is predicted according to one of the plurality of candidate intra prediction modes, selecting an intra prediction mode to be used in intra predicting the current block, wherein the intra prediction mode is from among the plurality of candidate intra prediction modes; and performing intra prediction on the current block, according to the selected intra prediction mode.

According to another aspect of the present invention, there is provided a video decoding apparatus including a candidate intra prediction mode determiner configured to determine a reference intra prediction mode, based on availability and a prediction mode of an adjacent block of a current block, and determine a plurality of candidate intra prediction modes for the current block, based on the reference intra prediction mode; and an intra predictor configured to obtain, from a bitstream, intra prediction data including information regarding an intra prediction mode of the current block, when the intra prediction data indicates that the current block is predicted according to one of the plurality of candidate intra prediction modes, select an intra prediction mode to be used in intra predicting the current block, wherein the intra prediction mode is from among the plurality of candidate intra prediction modes, and perform intra prediction on the current block, according to the selected intra prediction mode.

According to another aspect of the present invention, there is provided a computer-readable recording medium having recorded thereon a program for executing the video decoding method or a video encoding method by using a computer.

MODE OF THE INVENTION

Hereinafter, a video encoding method and a video decoding method based on a prediction technique in an intra prediction mode according to embodiments are provided with reference to FIGS. 1 through 6. Also, embodiments in which a prediction technique in an intra prediction mode is used in a video encoding method and a video decoding method based on coding units of a tree structure according to embodiments are provided with reference to FIGS. 7 through 19.

In the present specification, the term 'prediction block' means a prediction unit. Also, the term 'current block' means a prediction unit that is currently being encoded/decoded. Also, the term 'adjacent block' means a prediction unit that is adjacent to the current block. The prediction unit will be described in detail with reference to FIGS. 16 through 18.

First, the video encoding method and the video decoding method based on the prediction technique in the intra prediction mode according to an embodiment will be described with reference to FIGS. 1 through 6.

FIG. 1 shows a block diagram of a video encoding apparatus 10, according to an embodiment of the present invention.

The video encoding apparatus 10 may encode video data of a spatial domain through intra prediction/inter prediction, transformation, quantization, and entropy encoding. With reference to FIG. 1, operations that occur in the video encoding apparatus 10 when the video encoding apparatus 10 encodes intra prediction mode information generated as a result of intra prediction performed by the video encoding apparatus 10 will be described.

The video encoding apparatus 10 includes a candidate intra prediction mode determiner 12 and an intra prediction mode information encoder 14.

The video encoding apparatus 10 may divide image data of a video into a plurality of data units, and may encode each of the data units. The data unit may be formed as a square, a rectangle, or an arbitrary geometrical shape. The present invention is not limited to the data unit of a predetermined size. For convenience of description, a video encoding method with respect to a 'block' that is a type of data unit will be described. However, the video encoding method according to embodiments of the present invention is not limited to the video encoding method with respect to the 'block', and may be applied to various data units.

The candidate intra prediction mode determiner 12 determines a reference intra prediction mode, based on availability and a prediction mode of an adjacent block of a current block.

The candidate intra prediction mode determiner 12 may consider only a left adjacent block and an above adjacent block of the current block from among adjacent blocks of the current block, in consideration of a decoding order of the adjacent blocks. However, the candidate intra prediction mode determiner 12 may also consider other adjacent blocks as well as the left adjacent block and the above adjacent block of the current block.

The reference intra prediction mode may include a first reference intra prediction mode and a second reference intra prediction mode.

For example, when the left adjacent block of the current block is not present or is predicted through inter prediction, the candidate intra prediction mode determiner 12 may determine the first reference intra prediction mode as a first default intra prediction mode. The first default intra prediction mode is an intra prediction mode that is basically applied to the reference intra prediction mode and a candidate intra prediction mode when an intra prediction mode is not determinable with respect to the reference intra prediction mode and the candidate intra prediction mode. For example, the first default intra prediction mode may be set as a DC mode.

On the contrary, when the left adjacent block of the current block is predicted through the intra prediction, the candidate intra prediction mode determiner 12 may determine the first reference intra prediction mode as an intra prediction mode used in intra predicting the left adjacent block of the current block.

When the above adjacent block of the current block is not present or is predicted through the inter prediction, the candidate intra prediction mode determiner 12 may determine the second reference intra prediction mode as the first default intra prediction mode.

On the contrary, when the above adjacent block of the current block is predicted through the intra prediction, the candidate intra prediction mode determiner 12 may determine the second reference intra prediction mode as an intra prediction mode used in intra predicting the above adjacent block of the current block.

The candidate intra prediction mode determiner 12 determines a plurality of candidate intra prediction modes with respect to the current block, based on the reference intra prediction mode. The number of the candidate intra prediction modes may be fixed. For example, the candidate intra prediction mode determiner 12 may determine two candidate intra prediction modes.

The candidate intra prediction mode determiner 12 determines the candidate intra prediction modes according to whether the first reference intra prediction mode and the second reference intra prediction mode are different from each other or equal to each other.

For example, when the first reference intra prediction mode and the second reference intra prediction mode are same, and the first reference intra prediction mode is not a first default intra prediction mode, the candidate intra prediction mode determiner 12 may determine a first candidate intra prediction mode as the first default intra prediction mode, and may determine a second candidate intra prediction mode as the first reference intra prediction mode.

When the first reference intra prediction mode and the second reference intra prediction mode are same, and the first reference intra prediction mode indicates the first default intra prediction mode, the candidate intra prediction mode determiner 12 may determine the first candidate intra prediction mode as the first default intra prediction mode, and may determine the second candidate intra prediction mode as a second default intra prediction mode. When both the first reference intra prediction mode and the second reference intra prediction mode are the first default intra prediction mode, two candidate intra prediction modes have to be determined as different intra prediction modes, thus, the second candidate intra prediction mode is determined as the second default intra prediction mode.

When the first reference intra prediction mode and the second reference intra prediction mode are different, the candidate intra prediction mode determiner 12 may determine the first candidate intra prediction mode as an intra prediction mode having a smaller index value from among an index value representing the first reference intra prediction mode and an index value representing the second reference intra prediction mode, and may determine the second candidate intra prediction mode as an intra prediction mode having a greater index value from among the index value representing the first reference intra prediction mode and the index value representing the second reference intra prediction mode.

For example, when the first reference intra prediction mode is a vertical mode (an index value is 12), and the second reference intra prediction mode is a horizontal mode (an index value is 24), the first candidate intra prediction mode is determined as the vertical mode and the second candidate intra prediction mode is determined as the horizontal mode.

Based on an intra prediction mode used in the current block and the plurality of candidate intra prediction modes, the intra prediction mode information encoder 14 determines whether the current block is predicted according to one of the plurality of candidate intra prediction modes, and intra prediction data indicating the intra prediction mode used in the current block. Therefore, the intra prediction data may include a candidate intra prediction flag and current intra prediction data, wherein the candidate intra prediction flag indicates whether the current block is predicted according to one of the plurality of candidate intra prediction modes, and the current intra prediction data indicates the intra prediction mode used in the current block.

A size of the current intra prediction data may vary according to a value of the candidate intra prediction flag. In more detail, when it is indicated that the current block has been predicted based on one of the plurality of candidate intra prediction modes, the intra prediction mode information encoder 14 may express the current intra prediction data as 1 bit. On the other hand, when it is indicated that the current block has been predicted based on one of the intra prediction modes that are not the candidate intra prediction mode, the intra prediction mode information encoder 14 may express the current intra prediction data as at least 2 bits.

When the intra prediction mode used in the current block is a candidate intra prediction mode, the intra prediction mode information encoder 14 sets the intra prediction data to indicate that the current block is predicted according to one of the candidate intra prediction modes.

On the other hand, when the intra prediction mode used in the current block is not the candidate intra prediction mode, the intra prediction mode information encoder 14 sets the intra prediction data to indicate that the current block is predicted according to one of the intra prediction modes that are not the candidate intra prediction mode.

For example, the candidate intra prediction flag may be set to indicate whether the current block is predicted according to one of the candidate intra prediction modes. According to an embodiment, when the candidate intra prediction mode is used, the candidate intra prediction flag may indicate 1. When the candidate intra prediction mode is not used, the candidate intra prediction flag may indicate 0.

When the current block is predicted according to one of the candidate intra prediction modes, the intra prediction mode information encoder 14 may encode the intra prediction data to indicate an intra prediction mode used in the current block, the intra prediction mode being from among the plurality of candidate intra prediction modes. In more detail, the intra prediction mode information encoder 14 may encode current intra prediction data of the intra prediction data to indicate the intra prediction mode used in the current block.

A size of data indicating the intra prediction mode used in the current block is determined according to the number of the candidate intra prediction modes. For example, when the candidate intra prediction mode determiner 12 determines two candidate intra prediction modes, the current intra prediction data may be expressed as 1 bit.

When the intra prediction data indicates that the current block is predicted according to the intra prediction mode that is not the candidate intra prediction mode, the intra prediction mode information encoder 14 may encode the intra prediction data to indicate an intra prediction mode used in the current block, wherein the intra prediction mode is from among the intra prediction modes that are not the candidate intra prediction modes. In more detail, the intra prediction mode information encoder 14 may encode the current intra prediction data of the intra prediction data to indicate the intra prediction mode used in the current block.

When it is indicated that the current block is predicted based on the intra prediction mode that is not the candidate intra prediction mode, the intra prediction mode information encoder 14 may change an index value allocated to the intra prediction mode, according to the candidate intra prediction mode, and may include a changed index value in the intra prediction data.

Table 2 shows changed index values of the candidate intra prediction modes which are included in the intra prediction data.

Therefore, the video encoding apparatus 10 according to an embodiment may encode and output information generated as a result of intra predicting the blocks of the video.

The video encoding apparatus 10 according to an embodiment may include a central processor (not shown) for overall controlling the candidate intra prediction mode determiner 12 and the intra prediction mode information encoder 14. Otherwise, the candidate intra prediction mode determiner 12 and the intra prediction mode information encoder 14 may be respectively driven by exclusive processors (not shown), and the video encoding apparatus 10 may be driven overall by systematic operations of the processors (not shown). Otherwise, the candidate intra prediction mode determiner 12 and the intra prediction mode information encoder 14 may be controlled by an external processor (not shown) of the video encoding apparatus 10 according to an embodiment.

The video encoding apparatus 10 according to an embodiment may include one or more data storages (not shown) for storing input/output data of the candidate intra prediction mode determiner 12 and the intra prediction mode information encoder 14. The video encoding apparatus 10 may include a memory controller (not shown) for controlling data input/output of the data storage units (not shown).

The video encoding apparatus 10 according to the embodiment may perform the video encoding operation including the prediction and transformation by operating in connection with a video encoding processor mounted therein or an external video encoding processor in order to output the video encoding result. The internal video encoding processor in the video encoding apparatus 10 according to the embodiment may include a case where the video encoding apparatus 10 or a central calculation device or a graphic calculation device includes a video encoding processing module to perform a basic video encoding operation, as well as a separate processor.

Figure 2:
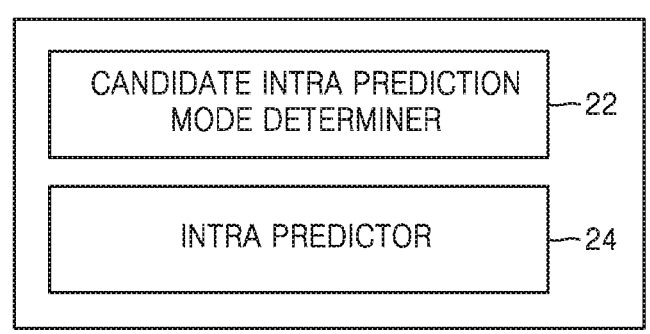
FIG. 2 shows a block diagram of a video decoding apparatus, according to an embodiment of the present invention.

FIG. 2 shows a block diagram of a video decoding apparatus 20, according to an embodiment of the present invention.

The video decoding apparatus 20 may decode video data, which was encoded by the video encoding apparatus 10, through entropy decoding, inverse-quantization, inverse-transformation, or intra prediction/motion compensation and thus may reconstruct video data that is adjacent to the original video data of the spatial domain. Hereinafter, processes, performed by the video decoding apparatus 20, of parsing symbols for the intra prediction from a bitstream and reconstructing the intra prediction mode from the parsed symbols will be described.

The video decoding apparatus 20 according to an embodiment includes a candidate intra prediction mode determiner 22 and an intra predictor 24.

The video decoding apparatus 20 may receive a bitstream including encoded data of the video.

The candidate intra prediction mode determiner 22 determines a reference intra prediction mode, based on availability and a prediction mode of an adjacent block of a current block. The candidate intra prediction mode determiner 22 determines a plurality of candidate intra prediction modes with respect to the current block, based on the reference intra prediction mode.

The candidate intra prediction mode determiner 22 of the video decoding apparatus 20 determines a candidate intra prediction mode according to a method equally performed by the candidate intra prediction mode determiner 12 of the video encoding apparatus 10. Therefore, the candidate intra prediction mode for the current mode is same in the video encoding apparatus 10 and the video decoding apparatus 20.

The intra predictor 24 obtains, from a bitstream, intra prediction data including information regarding an intra prediction mode of the current block. The intra prediction data may include a candidate intra prediction flag and current intra prediction data, wherein the candidate intra prediction flag indicates whether the current block is predicted according to one of the candidate intra prediction modes, and current intra prediction data indicates an intra prediction mode used in the current block.

When the intra prediction data indicates that the current block is predicted according to one of the candidate intra prediction modes, the intra predictor 24 may select an intra prediction mode to be used in intra predicting the current block, the intra prediction mode being from among the plurality of candidate intra prediction modes.

On the contrary, when the intra prediction data indicates that the current block is predicted according to one of intra prediction modes that are not included in the candidate intra prediction modes, the intra predictor 24 may select an intra prediction mode to be used in intra predicting the current block, based on the intra prediction data and index values of the candidate intra prediction modes.

The intra predictor 24 may parse the candidate intra prediction flag and thus may determine whether the current block is predicted according to one of the candidate intra prediction modes.

When the intra predictor 24 selects the intra prediction mode, based on the intra prediction data, the intra predictor 24 may change a value of the intra prediction data according to the candidate intra prediction modes.

For example, when it is assumed that two candidate intra prediction modes are present, and a value obtained by subtracting 2 from an index value of the intra prediction data is less than an index value representing a first candidate intra prediction mode, the intra predictor 24 may determine the intra prediction mode of the current block as an intra prediction mode corresponding to the value obtained by subtracting 2 from the index value of the intra prediction data.

When the value obtained by subtracting 2 from the index value of the intra prediction data is greater than the index value representing the first candidate intra prediction mode and is less than an index value representing a second candidate intra prediction mode, the intra predictor 24 may determine the intra prediction mode of the current block as an intra prediction mode corresponding to a value obtained by subtracting 1 from the index value of the intra prediction data.

When the value obtained by subtracting 2 from the index value of the intra prediction data is greater than the index value representing the second candidate intra prediction mode, the intra predictor 24 may determine the intra prediction mode of the current block as an intra prediction mode corresponding to the index value of the intra prediction data.

Embodiments in which the value of the intra prediction data is changed according to the candidate intra prediction modes are described with reference to Equation 2 and Table 2.

The intra predictor 24 may determine the intra prediction mode of the current block by parsing the current intra prediction data included in the intra prediction data. An embodiment thereof is described with reference to Equation 3.

As specific examples of selecting the aforementioned left/second reference intra prediction modes, an embodiment of a method of determining a candidate intra prediction mode and an embodiment of a method of determining intra prediction mode information of the current block by parsing intra prediction mode information are described below.

First, intra prediction modes of adjacent blocks of the current block are determined. An intra prediction mode of a left prediction block is intraPredModeA. Since a current prediction block is positioned at a left boundary of a video image, the left prediction block is not present, or when the left prediction block is predicted based on an inter prediction mode, intraPredModeA is determined as a DC mode.

The intra prediction mode of an above prediction block is intraPredModeB. Since the current prediction block is positioned at a top boundary of the video image, the above prediction block is not present, or when the above prediction block is predicted based on the inter prediction mode, intraPredModeB is determined as the DC mode.

intraPredModeA and intraPredModeB are used as reference values in determining a candidate intra prediction mode.

Then, the candidate intra prediction mode is determined based on intraPredModeA and intraPredModeB. An embodiment of determining the candidate intra prediction mode, by using Equation 1, will now be described.

if (intraPredMode$A$!=intraPredMode$B$)

predIntraPredMode0=min(intraPredMode$A$,intraPredMode$B$);

predIntraPredMode1=max(intraPredMode$A$,intraPredMode$B$);

if (intraPredMode$A$==intraPredMode$B$!=DC mode)

predIntraPredMode0=DC mode;

predIntraPredMode1=intraPredModeA;

if (intraPredModeA==intraPredModeB==DC mode)

predIntraPredMode0=DC mode;

predIntraPredMode1=Bilinear mode;   [Equation 1]

predIntraPredMode0 and predIntraPredMode1 respectively mean a first candidate intra prediction mode and a second candidate intra prediction mode. In an embodiment, two candidate intra prediction modes are determined for every one block. min(A, B) indicates a function by which a smaller value among A and B is output, and max(A, B) indicates a function by which a larger value among A and B is output.

According to Equation 1, if intraPredModeA and intraPredModeB are different from each other, a smaller value among intraPredModeA and intraPredModeB is allocated to predIntraPredMode0, and a larger value among intraPredModeA and intraPredModeB is allocated to predIntraPredMode1.

If intraPredModeA and intraPredModeB are same, and intraPredModeA is not 0, a DC mode is allocated to predIntraPredMode0. In addition, intraPredModeA is allocated to predIntraPredMode1.

If intraPredModeA and intraPredModeB are same, and intraPredModeA is 0, the DC mode is allocated to predIntraPredMode0. In addition, a Bilinear mode is allocated to predIntraPredMode1.

When predIntraPredMode0 and predIntraPredMode1 are determined, the intra prediction mode of the current block is determined by parsing intra_luma_pred_mode. An embodiment of a method of determining the intra prediction mode is described below with reference to Equation 2.

if (intra_luma_pred_mode==0)

IntraLumaPredMode=predIntraPredMode0;

if (intra_luma_pred_mode==1)

IntraLumaPredMode=predIntraPredMode1;

else if (intra_luma_pred_mode-2<predIntraPredMode0)

IntraLumaPredMode=intra_luma_pred_mode-2;

if (intra_luma_pred_mode-2>predIntraPredMode0
  && intra_luma_pred_mode-2<predIntraPredMode1)

IntraLumaPredMode=intra_luma_pred_mode-1;

else

IntraLumaPredMode=intra_luma_pred_mode;   [Equation 2]

intra_luma_pred_mode means intra prediction mode information regarding the current block. A value between 0 and 33 is allocated to intra_luma_pred_mode. IntraLumaPredMode means the intra prediction mode of the current block.

According to Equation 2, if intra_luma_pred_mode is 0, IntraLumaPredMode is determined as an intra prediction mode designated by predIntraPredMode0. If intra_luma_pred_mode is 0, IntraLumaPredMode is determined as an intra prediction mode designated by predIntraPred-Mode1. Therefore, when intra_luma_pred_mode is 0 or 1, it is possible to recognize that a candidate intra prediction mode is used.

If intra_luma_pred_mode is neither 0 nor 1, the candidate intra prediction mode is not used. Instead, IntraLumaPredMode is determined by comparing a value of intra_luma_pred_mode with a value of predIntraPredMode0 and a value of predIntraPredMode1.

If a value obtained by subtracting 2 from intra_luma_pred_mode is less than a value of predIntraPredMode0, IntraLumaPredMode is determined as an intra prediction mode corresponding to the value obtained by subtracting 2 from a value of intra_luma_pred_mode.

If the value obtained by subtracting 2 from intra_luma_pred_mode is greater than a value of predIntraPredMode0 and is less than a value of predIntraPredMode1, IntraLumaPredMode is determined as an intra prediction mode corresponding to a value obtained by subtracting 1 from the value of intra_luma_pred_mode.

If the value obtained by subtracting 2 from intra_luma_pred_mode is greater than the value of predIntraPredMode1, IntraLumaPredMode is determined as an intra prediction mode corresponding to the value of intra_luma_pred_mode.

As described above, IntraLumaPredMode that is the intra prediction mode of the current block may be obtained from intra_luma_pred_mode that is the intra prediction mode information.

When the intra prediction mode corresponding to IntraLumaPredMode is determined, the video decoding apparatus 20 predicts the current block according to the determined intra prediction mode.

Table 1 displays a binary symbol string corresponding to values of intra_luma_pred_mode. binIdx of Table 1 means a bin index allocated to each bin of the binary symbol string. The bin is a basic unit of entropy coding of context adaptive binary arithmetic coding (CABAC), and is expressed as 0 and 1. intra_luma_pred_mode may be entropy coded based on a relation between intra_luma_pred_mode presented in Table 1 and the binary symbol string.

TABLE 1

| intra_luma_pred_mode value | Binary symbol string | | | | | |
|---|---|---|---|---|---|---|
| 0 | 1 | 0 | | | | |
| 1 | 1 | 1 | | | | |
| 2 | 0 | 0 | 0 | 0 | 0 | 0 |
| 3 | 0 | 0 | 0 | 0 | 0 | 1 |
| 4 | 0 | 0 | 0 | 0 | 1 | 0 |
| ... | | | | | | |
| 32 | 0 | 1 | 1 | 1 | 1 | 0 |
| 33 | 0 | 1 | 1 | 1 | 1 | 1 |
| binIdx | 0 | 1 | 2 | 3 | 4 | 5 | 6 |

If a value of intra_luma_pred_mode is one of values of 2 through 33, the binary symbol string is expressed as 6 bits. However, if the value of intra_luma_pred_mode is 0 or 1, the binary symbol string is expressed as 2 bits.

Two intra prediction modes corresponding to the candidate intra prediction mode are allocated to 0 and 1 of intra_luma_pred_mode, thus, when the current block is predicted based on an intra prediction mode included in the candidate intra prediction mode, data of the binary symbol string of intra_luma_pred_mode with respect to the intra prediction mode of the current block is expressed as 2 bits.

Therefore, since an intra prediction mode having high availability is determined as the candidate intra prediction mode, data regarding the intra prediction mode information may be efficiently compressed.

In Table 1, the binary symbol string corresponding to the value of intra_luma_pred_mode may be split into a candidate intra prediction mode flag (hereinafter, referred to as the 'mpm_flag') and current intra prediction mode information and may be parsed.

Referring to Table 1, the candidate intra prediction mode flag corresponds to a bin whose bin index of the binary symbol string is 0. If the candidate intra prediction mode flag is 1, the intra prediction mode of the current block may be determined as one of two candidate intra prediction modes. The video decoding apparatus 20 may determine, from among candidate intra prediction modes, an intra prediction mode to be used in predicting the current block, according to a value of a bin whose binIdx is 1 (hereinafter, 'mpm_index'). For example, if mpm_index indicates 0, the first candidate intra prediction mode may be selected as the intra prediction mode of the current block.

If the candidate intra prediction mode flag is 1, the intra prediction mode of the current block may be determined as one of intra prediction modes that are not the candidate intra prediction modes. The video decoding apparatus 20 may determine the intra prediction mode, according to values of five bins whose binIdx are 1 through 5 (hereinafter, 'Ipmode') and index values of the candidate intra prediction modes. Current intra prediction mode information may include the mpm_index and the Ipmode. With reference to Equation 3, an embodiment of predicting the current block according to a value of the Ipmode is described.

Table 2 below shows intra prediction modes allocated to values of IntraLumaPredMode. The algorithm of Equation 2 is described with reference to Table 2.

TABLE 2

| IntraLumaPredMode value | Intra prediction mode |
|---|---|
| 0 | Intra_Luma_DC |
| 1 | Intra_Luma_Plane |
| 2 | Intra_Luma_Bilinear |
| 3~11 | Intra_Luma_Angular |
| 12 | Intra_Luma_Vertical |
| 13~23 | Intra_Luma_Angular |
| 24 | Intra_Luma_Horizontal |
| 25~32 | Intra_Luma_Angular |

According to Equation 2, an index value of IntraLumaPredMode in Table 2 is derived from an index value of intra_luma_pred_mode in Table 1. In a video encoding procedure, intra prediction modes that are the candidate intra prediction modes are allocated to 0 and 1, and remaining intra prediction modes are allocated to 2 through 32 of intra_luma_pred_mode. Therefore, a decoding procedure requires a process of determining IntraLumaPredMode from the index value of intra_luma_pred_mode by taking into account the candidate intra prediction modes. An embodiment in which IntraLumaPredMode is determined in the decoding procedure is described with reference to Table 3.

TABLE 3

| predIntraPredMode0 intra_luma_pred_mode | 5 IntraLumaPredMode | predIntraPredMode1 intra_luma_pred_mode | 12 IntraLumaPredMode |
|---|---|---|---|
| 0 | 5 | 17 | 17 |
| 1 | 12 | 18 | 18 |
| 2 | 0 | 19 | 19 |
| 3 | 1 | 20 | 20 |
| 4 | 2 | 21 | 21 |
| 5 | 3 | 22 | 22 |
| 6 | 4 | 23 | 23 |
| 7 | 6 | 24 | 24 |
| 8 | 7 | 25 | 25 |
| 9 | 8 | 26 | 26 |
| 10 | 9 | 27 | 27 |
| 11 | 10 | 28 | 28 |
| 12 | 11 | 29 | 29 |
| 13 | 13 | 30 | 30 |
| 14 | 14 | 31 | 31 |
| 15 | 15 | 32 | 32 |
| 16 | 16 | | |

Referring to Table 3, if the candidate intra prediction modes are 5 and 12, values of predIntraPredMode0 and predIntraPredMode1 indicating the candidate intra prediction modes become 5 and 12, respectively.

If a value of intra_luma_pred_mode indicating intra prediction mode information is 0 or 1, the intra prediction mode of the current block is determined as one of the candidate intra prediction modes. Referring to Table 3, if the value of intra_luma_pred_mode is 0 or 1, values of IntraLumaPredMode become 5 and 12, respectively.

If the value of intra_luma_pred_mode indicating the intra prediction mode information is one of 2 through 32, the values of IntraLumaPredMode are determined by using Equation 2. Referring to Table 3, when intra_luma_pred_mode is one of 2 through 6, (intra_luma_pred_mode-2) are less than 5 that is a first candidate intra prediction mode, thus, the values of IntraLumaPredMode are determined as 0 through 4 corresponding to (intra_luma_pred_mode-2).

When the value of intra_luma_pred_mode is between 7 through 12, (intra_luma_pred_mode-2) is greater than 5 that is the first candidate intra prediction mode, and is less than 12 that is a second candidate intra prediction mode, thus, the values of IntraLumaPredMode are determined as 6 through 11 corresponding to (intra_luma_pred_mode-1).

When the value of intra_luma_pred_mode is between 13 through 32, (intra_luma_pred_mode-2) is greater than 12 that is the second candidate intra prediction mode, thus, the values of IntraLumaPredMode are determined as 13 through 32 corresponding to (intra_luma_pred_mode).

With reference to Equation 3, an embodiment of a method of determining, from intra prediction data, an intra prediction mode of a current block is described.

In Equation 3, mpm_flag means a candidate intra prediction mode flag in intra prediction data. When the current block is predicted based on an intra prediction mode that is not a candidate intra prediction mode, Ipmode means information indicating the intra prediction mode of the current block. IntraLumaPredMode means an index value of the intra prediction mode actually used in intra predicting the current block as in Equation 2. The video decoding apparatus 20 compares Ipmode with predIntraPredMode0 and predIntraPredMode1 that mean the candidate intra prediction modes, and changes a value of Ipmode according to a result of the comparison. Then, the value of Ipmode is applied to true_ipmode.

When the current block is predicted based on an intra prediction mode that is a candidate intra prediction mode, mpm_index means an index value indicating the candidate intra prediction mode.

If (mpm_flag==0)

If (Ipmode<predIntraPredMode0)

IntraLumaPredMode=Ipmode;

If (Ipmode>=predIntraPredMode0)

Ipmode++;

If (Ipmode<predIntraPredMode1)

IntraLumaPredMode=Ipmode;

If (Ipmode>=predIntraPredMode1)

IntraLumaPredMode=Ipmode+1;

If (mpm_flag==1)

If (mpm_index==0)

IntraLumaPredMode=predIntraPredMode0;

If (mpm_index==1)

IntraLumaPredMode=predIntraPredMode1;                [Table 3]

If mpm_flag is 0, the video decoding apparatus 20 determines that the current block is predicted based on the intra prediction mode that is not the candidate intra prediction mode. According to a result of Equation 3, if Ipmode is less than predIntraPredMode0, the video decoding apparatus 20 determines that IntraLumaPredMode and Ipmode have a same value. However, if Ipmode is equal to or greater than predIntraPredMode0, the video decoding apparatus 20 increased a value of Ipmode by 1, and compares Ipmode with predIntraPredMode1.

If Ipmode is less than predIntraPredMode1, it is determined that IntraLumaPredMode and Ipmode have a same value. However, if Ipmode is equal to or greater than predIntraPredMode1, it is determined that IntraLumaPredMode has a value obtained by adding 1 to a value of Ipmode.

For example, when index values of the intra prediction mode corresponding to the candidate intra prediction mode are 5 and 12, if Ipmode is 3, 3 is applied to IntraLumaPredMode. If Ipmode is 8, 9 is applied to IntraLumaPredMode. If Ipmode is 15, 17 is applied to IntraLumaPredMode.

When mpm_flag is 0, the video decoding apparatus 20 determines that the current block is predicted based on an intra prediction mode that is the candidate intra prediction mode. When mpm_index is 0, the video decoding apparatus 20 determines that IntraLumaPredMode and predIntraPredMode0 have a same value. When mpm_index is 1, the video decoding apparatus 20 determines that IntraLumaPredMode and predIntraPredMode1 have a same value.

The video decoding apparatus 20 predicts the current block according to the intra prediction mode indicated by IntraLumaPredMode determined by using Equation 3.

According to an embodiment, by using the aforementioned method, data regarding intra prediction mode information is parsed and thus the intra prediction mode of the current block is determined.

A video decoding apparatus 20 according to an embodiment may include a central processor (not shown) that generally controls the candidate intra prediction mode determiner 22 and the intra predictor 24. Otherwise, the candidate intra prediction mode determiner 22 and the intra predictor 24 are respectively driven by exclusive processors (not shown), and the video decoding apparatus 20 may be driven overall by systematical operations of the processors (not shown). Otherwise, the candidate intra prediction mode determiner 22 and the intra predictor 24 may be controlled by an external processor (not shown) of the video decoding apparatus 20 according to the embodiment.

According to the embodiment, the video decoding apparatus 20 may include one or more data storages (not shown) for storing input/output data of the candidate intra prediction mode determiner 22 and the intra predictor 24. The video decoding apparatus 20 may include a memory controller (not shown) for controlling data input/output of the data storages (not shown).

The video decoding apparatus 20 may perform the video decoding operation including the inverse transformation by operating in connection with a video decoding processor mounted therein or an external video decoding processor in order to reconstruct the video through the video decoding. The internal video decoding processor in the video decoding apparatus 20 according to the embodiment may include a case where the video decoding apparatus 20, or a central calculation device or a graphic calculation device includes a video decoding processing module to perform a basic video decoding operation, as well as a separate processor.

According to the video encoding apparatus 10 and the video decoding apparatus 20 described with reference to FIGS. 1 and 2, when the intra prediction mode is reconstructed by parsing the symbols of the blocks from the bitstream, the symbols of the blocks including the intra prediction data is parsed, and then, the current intra prediction mode may be reconstructed based on the intra prediction data of the current block among the parsed symbols. Therefore, a process of parsing the symbols of the blocks from the bitstream and a process of reconstructing the intra prediction mode from the parsed symbols may be separated from each other. Unless the processes of parsing and reconstructing the symbols are separated, the symbols have to be reconstructed while the symbols are parsed, and the symbols are parsed again, that is, the operations of parsing and reconstructing the block symbols are repeated, thereby degrading efficiency of the decoding process. Therefore, according to the video encoding apparatus 10 and the video decoding apparatus 20 of the present embodiment, the processes of parsing and reconstructing the intra prediction mode are separated during the process of parsing the symbols, and accordingly, efficiency of the decoding process may be improved.

If the number of candidate intra prediction modes varies depending on cases even when there are a plurality of candidate intra prediction modes, the parsing process becomes complicated because variables according to the number of the candidate intra prediction modes have to be considered when the intra related information is parsed. However, according to the video decoding apparatus 20 of the present embodiment, the constant number of candidate intra prediction modes are assumed when predicting the intra prediction mode by using the candidate intra prediction modes, and thus, the intra prediction data may be parsed without considering a case where the number of candidate intra prediction modes is changed during the symbol parsing process, thereby reducing the complexity of the parsing operation.

Hereinafter, various embodiments of predicting the intra prediction modes that may be implemented in the video encoding apparatus 10 and the video decoding apparatus 20 according to the embodiment will be described.

Figure 3:
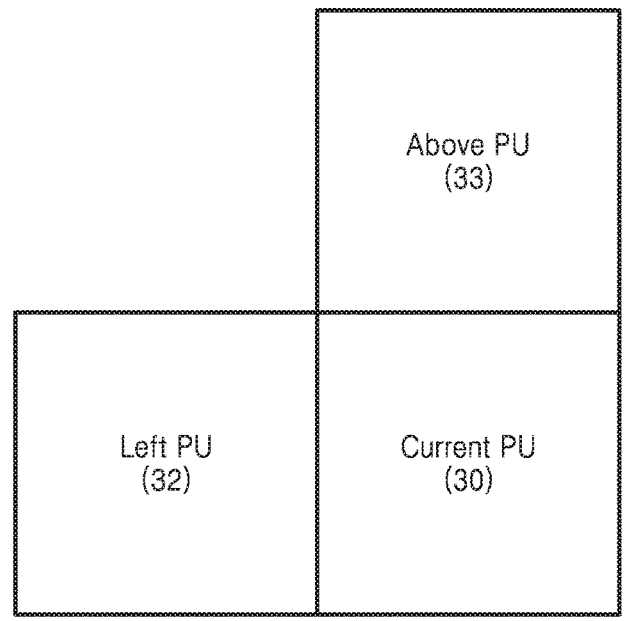
FIG. 3 illustrates neighboring prediction units referred to so as to predict intra prediction modes, according to an embodiment.

FIG. 3 illustrates blocks referred to so as to predict the intra prediction modes, according to an embodiment.

A prediction unit (PU) is a data unit for performing prediction by each coding unit (CU), in a video encoding method based on a coding unit according to a tree structure. The video encoding apparatus 10 and the video decoding apparatus 20 according to the present embodiment are not limited to the PU having a fixed size, but may perform the prediction on PUs of various sizes. The video decoding method and the PU based on the coding unit according to the tree structure will be described later with reference to FIGS. 7 through 19. Hereinafter, embodiments for predicting the intra prediction mode of the PU will be described; however, the above embodiments may be applied similarly to various types of blocks.

The video encoding apparatus 10 according to the present embodiment may determine a reference intra prediction unit according to availability of intra prediction modes of a left PU 32 and an above PU 33.

For example, if a current block 30 is positioned at a left boundary of an image and thus the left PU 32 is not present, or if the left PU 32 is predicted based on an inter prediction mode, a first reference intra prediction mode may be determined as a first default intra prediction mode. If the left PU 32 is predicted based on an intra prediction mode, the first reference intra prediction mode may be determined as the intra prediction mode of the left PU 32.

If the current block 30 is positioned at a top boundary of the image and thus the above PU 33 is not present, or if the above PU 33 is predicted based on an inter prediction mode, the second reference intra prediction mode may be determined as the first default intra prediction mode. If the above PU 33 is predicted based on an intra prediction mode, the second reference intra prediction mode may be determined as the intra prediction mode of the above PU 33.

In addition, candidate intra prediction modes may be determined by comparing the first reference intra prediction mode with the second reference intra prediction mode.

A prediction unit that is neither the left PU 32 nor the above PU 33 illustrated in FIG. 3 may be referred to, and depending on cases, three or more PUs may be referred to.

Figure 4:
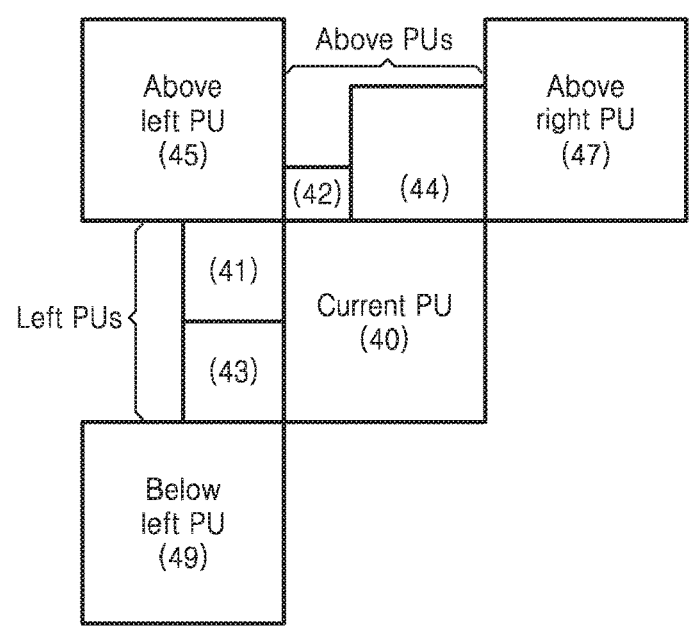
FIG. 4 illustrates examples of prediction units (PUs) that are referred to so as to predict the intra prediction mode in video encoding based on a coding unit according to a tree structure.

FIG. 4 illustrates examples of PUs that are referred to so as to predict the intra prediction mode in the video encoding based on a coding unit according to a tree structure. Unlike FIG. 3, FIG. 4 illustrates a plurality of adjacent blocks 41, 42, 43, 45, 47, and 49 at left and above sides of a current block 40. In this regard, a method of determining a reference intra prediction mode when a plurality of adjacent blocks are present is described below.

In order to predict an intra prediction mode of a current PU 40, a left PU 41 and an above PU 42 may be first referred to. If there are many PUs adjacent to a left or top boundary of the current PU 40, the intra prediction modes of the left and above PUs 41 and 42 that are adjacent to an upper left sample in the current PU 40 may be referred to with priority.

If the intra prediction modes of the left PU 41 and the above PU 42 are the same as each other, intra prediction modes of neighboring PUs of predetermined positions except for the left and above PUs 41 and 42 from among the neighboring PUs adjacent to the current PU 40 may be referred to. For example, the intra prediction modes of an above left PU 45, an above right PU 47, and a below left PU 49 may be referred to. If one of the intra prediction modes of the above left PU 45, the above right PU 47, and the below left PU 49 is different from the intra prediction modes of the left and above PUs 41 and 42, it may be adopted as the candidate intra prediction mode.

For example, the first rank candidate intra prediction mode may be the intra prediction modes of the left PU 41 and the above PU 42. It is detected whether there is an intra prediction mode that is the different from the intra prediction modes of the left and above PUs 41 and 42, from among the intra prediction modes of the above left PU 45, the above right PU 47, and the below left PU 49 in a predetermined order, and the intra prediction mode that is detected first may be adopted as the second rank candidate intra prediction mode.

As another example, if the intra prediction modes of the left and above PUs 41 and 42 are the same as each other, it is detected sequentially in a predetermined order whether there is an intra prediction mode that is different from the intra prediction modes of the left and above PUs 41 and 42 from among the intra prediction modes of the neighboring PUs 43, 44, 45, 47, and 49 except for the left and above PUs, and the intra prediction mode that is detected first may be adopted as the second rank candidate prediction mode.

In more detail, the intra prediction mode is compared with the intra prediction modes of the left and above PUs 41 and 42 starting from the above right PU 47, and it may be determined by searching whether there is the PU having the intra prediction mode that is different from the intra prediction modes of the left and above PUs 41 and 42 along the neighboring PUs 47, 44, and 45 positioned on an upper portion of the current PU 40. The intra prediction mode that is detected first may be adopted as the second rank candidate intra prediction mode.

After searching for the above left PU 45, if there is no intra prediction mode that is different from the intra prediction modes of the left and above PUs 41 and 42, it may be determined by searching whether there is the PU having the intra prediction mode that is different from the intra prediction modes of the left and above PUs 41 and 42 starting from the below left PU 49 upward along the neighboring PUs positioned at a left side of the current PU 40. The intra prediction mode detected first may be adopted as the second rank candidate intra prediction mode.

In the above embodiment, the neighboring PUs positioned on an upper portion of the current PU starting from the upper right PU 47 are searched for, and then, the neighboring PUs positioned at the left side of the current PU starting from the below left PU 49 are searched for; however, the above searching order may vary.

In a case where one of the first and second reference intra prediction modes is the same as the current intra prediction mode and the first reference intra prediction mode and the second reference intra prediction mode are the same as each other, various embodiments of determining the plurality of different candidate intra prediction modes are described above.

As described above, the video encoding apparatus 10 and the video decoding apparatus 20 of the present embodiment may predict the current intra prediction mode by using the plurality of candidate intra prediction modes that are always different from each other in a case where there is one of the first and second reference intra prediction modes, which is the same as the current prediction mode, and the first and second reference intra prediction modes are different from or the same as each other.

Accordingly, if the intra prediction modes of the neighboring left and above blocks are the same as each other, the video encoding apparatus 10 does not need to encode the information representing a case where the number of candidate intra prediction modes is changed, and may encode, as the information related to the intra prediction mode, information regarding whether the current block is predicted based on the candidate intra prediction mode and information regarding the intra prediction mode of the current PU 30.

Therefore, the video decoding apparatus 20 according to the present embodiment only parses information regarding whether the candidate intra prediction mode is used and the information regarding the intra prediction mode of the current PU 30 during the process of parsing the information related to the intra prediction with respect to the current block, and there is no need to determine whether the intra prediction modes of the neighboring left and above blocks are the same as each other. Since there is no need to determine whether the intra prediction modes of the left and above blocks are the same as each other, there is no need to reconstruct the intra prediction modes of the left and above blocks. In addition, since the process of reconstructing the intra prediction mode from the parsed symbols during a process of parsing the symbols and parsing the symbols again is skipped, the process of parsing the intra prediction mode may be performed promptly. As such, efficiency of the decoding process including the parsing and reconstructing of the intra prediction mode may be improved.

Also, the prediction mode of the intra prediction mode for processing only one candidate intra prediction mode is skipped, and thus, the decoding process may be simplified.

Figure 5:
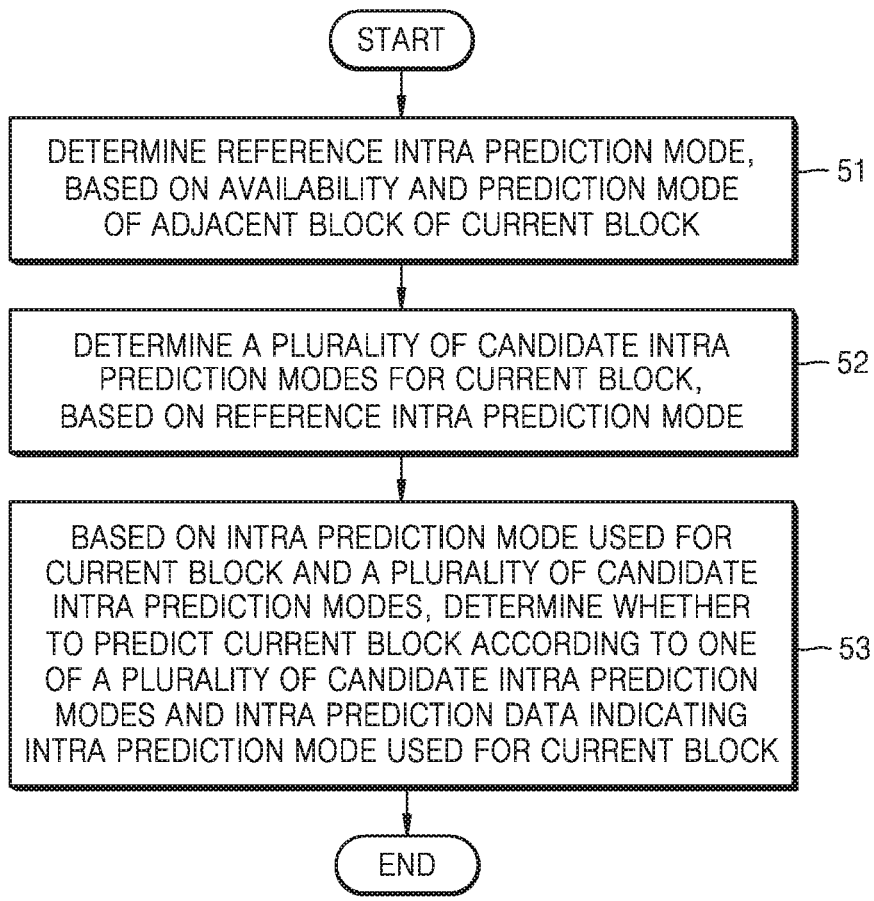
FIG. 5 is a flowchart illustrating a video encoding method, according to an embodiment of the present invention.

FIG. 5 is a flowchart illustrating a video encoding method, according to an embodiment of the present invention.

In operation 51, a reference intra prediction mode is determined based on availability and a prediction mode of an adjacent block of a current block.

According to an embodiment, if a left adjacent block of the current block is not present or the left adjacent block of the current block is predicted based on inter prediction, a first reference intra prediction mode may be determined as a first default intra prediction mode.

On the other hand, if the left adjacent block of the current block is predicted based on intra prediction, the first reference intra prediction mode may be determined as an intra prediction mode used in intra predicting the left adjacent block of the current block.

In a same manner as the aforementioned method of determining the first reference intra prediction mode, if an above adjacent block of the current block is not present or the above adjacent block of the current block is predicted based on inter prediction, a second reference intra prediction mode may be determined as the first default intra prediction mode.

On the other hand, if the above adjacent block of the current block is predicted based on intra prediction, the second reference intra prediction mode may be determined as an intra prediction mode used in intra predicting the above adjacent block of the current block.

In operation 52, a plurality of candidate intra prediction modes for the current block are determined based on the reference intra prediction mode.

When the first reference intra prediction mode and the second reference intra prediction mode are same, and the first reference intra prediction mode is not the first default intra prediction mode, a first candidate intra prediction mode may be determined as the first default intra prediction mode, and a second candidate intra prediction mode may be determined as the first reference intra prediction mode.

When the first reference intra prediction mode and the second reference intra prediction mode are same, and the first reference intra prediction mode indicates the first default intra prediction mode, the first candidate intra prediction mode may be determined as the first default intra prediction mode, and the second candidate intra prediction mode may be determined as a second default intra prediction mode.

When the first reference intra prediction mode and the second reference intra prediction mode are different, the first candidate intra prediction mode may be determined as an intra prediction mode having a smaller index value between the first reference intra prediction mode and the second reference intra prediction mode.

On the other hand, the second candidate intra prediction mode may be determined as an intra prediction mode having a larger index value between the first reference intra prediction mode and the second reference intra prediction mode.

In operation 53, based on the intra prediction mode used for the current block and the plurality of candidate intra prediction modes, whether to predict the current block according to one of the candidate intra prediction modes and intra prediction data indicating the intra prediction mode used for the current block are determined.

The intra prediction data may include a part indicating whether the current block is predicted based on one of the candidate intra prediction modes, and a part indicating the intra prediction mode used for the current block.

When the current block is predicted based on one of the candidate intra prediction modes, a size of data indicating the intra prediction mode used for the current block is determined according to the number of the candidate intra prediction modes.

When the current block is predicted based on the intra prediction mode that is not the candidate intra prediction mode, an index value allocated to the intra prediction mode is changed according to the candidate intra prediction mode, and a changed index value may be included in the intra prediction data.

Figure 6:
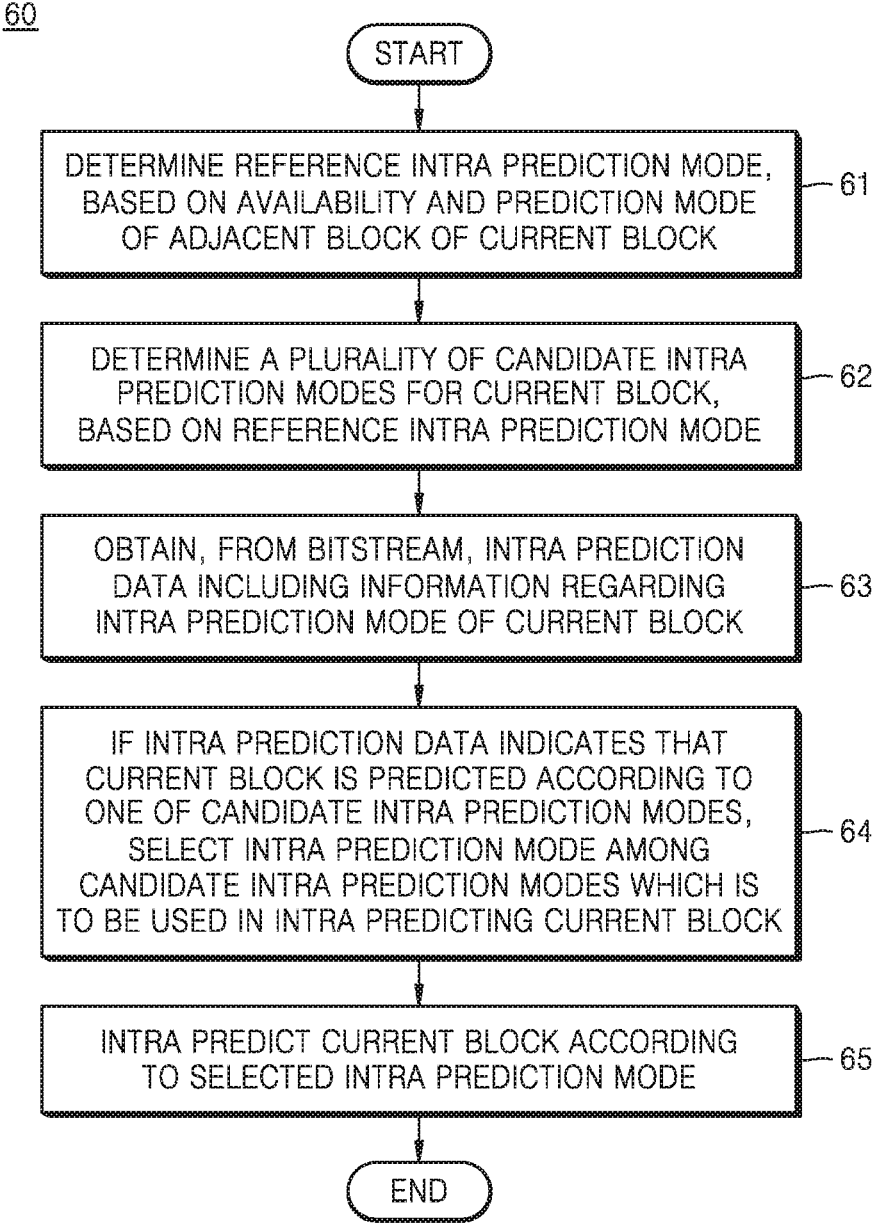
FIG. 6 shows a flowchart illustrating a video decoding method, according to an embodiment of the present invention.

FIG. 6 shows a flowchart illustrating a video decoding method 60, according to an embodiment of the present invention.

In operation 61, a reference intra prediction mode is determined based on availability and a prediction mode of an adjacent block of a current block.

In operation 62, a plurality of candidate intra prediction modes for the current block are determined based on the reference intra prediction mode.

In operation 63, a candidate intra prediction flag indicating whether the current block is predicted based on one of the plurality of candidate intra prediction modes is obtained from a bitstream.

In operation 64, if the candidate intra prediction flag obtained in the operation 63 indicates that the current block is predicted according to one of the candidate intra prediction modes, a candidate selection index is obtained from the bitstream. an intra prediction mode to be used in intra predicting the current block, the intra prediction mode being from among the plurality of candidate intra prediction modes, is selected according to the candidate selection index.

In operation 65, intra prediction is performed on the current block according to the selected intra prediction mode Unlike the operations 64 and 65, if the candidate intra prediction flag indicates that the current block is predicted based on one of intra prediction modes that are not included in the candidate intra prediction modes, an intra prediction mode selection index is obtained from the bitstream, and an intra prediction mode to be used in intra predicting the current block may be selected based on the intra prediction mode selection index.

When the intra prediction mode is selected based on the intra prediction mode selection index, a value indicated by the intra prediction mode selection index may be changed according to the candidate intra prediction modes.

As described above, the video encoding apparatus 10 according to an embodiment and the video decoding apparatus 20 according to another embodiment split blocks of divided video data into coding units of a tree structure, and prediction units are used for intra prediction with respect to the coding units. Hereinafter, with reference to FIGS. 7 through 19, a video encoding method and apparatus therefor, and a video decoding method and apparatus therefor based on coding units of a tree structure and transformation units according to embodiments are described.

Figure 7:
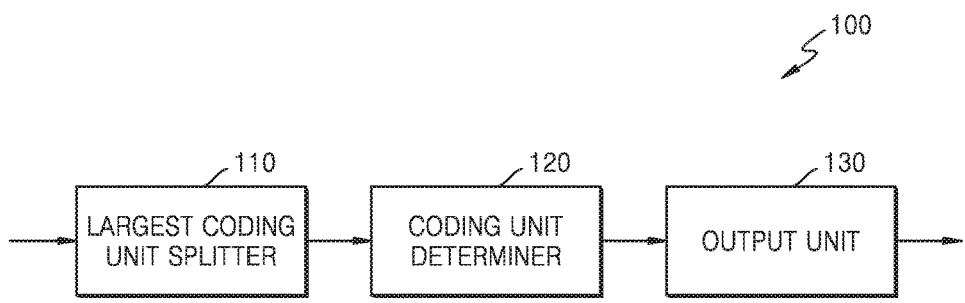
FIG. 7 illustrates a block diagram of a video encoding apparatus based on coding units of a tree structure, according to an embodiment of the present invention.

FIG. 7 illustrates a block diagram of a video encoding apparatus based on coding units of a tree structure 100, according to an embodiment of the present invention.

The video encoding apparatus involving video prediction based on coding units of the tree structure 100 includes a largest coding unit splitter 110, a coding unit determiner 120 and an output unit 130. Hereinafter, for convenience of description, the video encoding apparatus involving video prediction based on coding units of the tree structure 100 is referred to as the 'video encoding apparatus 100'.

The largest coding unit splitter 110 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2. The image data may be output to the coding unit determiner 120 according to the at least one largest coding unit.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a final encoding result according to the at least one split region. That is, the coding unit determiner 120 determines a coded depth by encoding the image data in the deeper coding units according to depths, according to the largest coding unit of the current picture, and selecting a depth having the least encoding error. The determined coded depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one coded depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the coded depths may differ according to regions in the image data. Thus, one or more coded depths may be determined in one largest coding unit, and the image data of the largest coding unit may be divided according to coding units of at least one coded depth.

Accordingly, the coding unit determiner 120 according to an embodiment may determine coding units having a tree structure included in a current largest coding unit. The 'coding units having a tree structure' according to an embodiment include coding units corresponding to a depth determined to be the coded depth, from among all deeper coding units included in the current largest coding unit. A coding unit of a coded depth may be hierarchically determined according to depths in the same region of the largest coding unit, and may be independently determined in different regions. Equally, a coded depth in a current region may be independently determined from a coded depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a coded depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type may selectively include symmetrical partitions obtained by symmetrically splitting a height or width of the prediction unit, partitions obtained by asymmetrically splitting the height or width of the prediction unit, such as 1:n or n:1, partitions obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 100 according to an embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to coded depths requires not only information about a coded depth but also requires information related to prediction and transformation. Accordingly, the coding unit determiner 120 may determine not only a coded depth generating a least encoding error but may also determine a partition mode in which a prediction unit is split to partitions, a prediction type according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 7 through 19.

The coding unit determiner 120 may measure an encoding error of deeper coding units according to depths by using rate-distortion optimization based on Lagrangian multipliers.

The output unit 130 outputs, in a bitstream, the image data of the largest coding unit, which is encoded based on the at least one coded depth determined by the coding unit determiner 120, and information regarding an encoding mode according to depths.

The encoded image data may correspond to a result obtained by encoding residual data of an image.

The encoding mode information according to depths may include coded depth information, partition type information of the prediction unit, prediction mode information, and transformation unit size information.

Coded depth information may be defined by using split information according to depths, which specifies whether encoding is performed on coding units of a lower depth instead of a current depth. If the current depth of the current coding unit is a coded depth, the current coding unit is encoded by using the coding unit of the current depth, and thus split information of the current depth may be defined not to split the current coding unit to a lower depth. On the contrary, if the current depth of the current coding unit is not the coded depth, the encoding has to be performed on the coding unit of the lower depth, and thus the split information of the current depth may be defined to split the current coding unit to the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of encoding mode information has to be determined for a coding unit of a coded depth, at least one piece of encoding mode information may be determined for one largest coding unit. Also, a coded depth of data of the largest coding unit may vary according to locations since the data is hierarchically split according to depths, and thus a coded depth and encoding mode information may be set for the data.

Accordingly, the output unit 130 according to an embodiment may assign encoding information about a corresponding coded depth and an encoding mode to at least one of the coding unit, the prediction unit, and a minimum unit included in the largest coding unit.

The minimum unit according to an embodiment is a square data unit obtained by splitting the smallest coding unit constituting the lowermost coded depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information, prediction information, uni-direction prediction information, and slice type information including a fourth slice type which are related to prediction described above with reference to FIGS. 1 through 6.

According to the simplest embodiment for the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus 100 of FIG. 7 may perform operations of the video encoding apparatus 10 described above with reference to FIG. 1

The coding unit determiner 120 may determine the prediction unit for the intra prediction and may perform the intra prediction on every prediction unit, according to each of the coding units having the tree structure at every largest coding unit.

The output unit 130 may perform operations of the candidate intra prediction mode determiner 12 and the intra prediction mode information encoder 14 of the video encoding apparatus 10. The output unit 130 may encode intra prediction mode information so as to perform prediction on each prediction unit in an intra prediction mode. The output unit 130 may determine a reference intra prediction mode, based on availability and a prediction mode of a neighboring block of a current block. The output unit 130 may determine a plurality of candidate intra prediction modes for the current block, based on the reference intra prediction mode. When the current block is predicted based on one of the candidate intra prediction modes, the output unit 130 may encode intra prediction data to indicate an intra prediction mode used for the current block, the intra prediction mode being from among the plurality of candidate intra prediction modes.

The output unit 130 may determine the number of candidate intra prediction modes for every picture. Similarly, the number of candidate intra prediction modes may be determined for every slice, for every largest coding unit, for every coding unit, or for every prediction unit. The embodiment is not limited thereto, and the number of candidate intra prediction modes may be determined again for every predetermined data unit.

The output unit 130 may encode information representing the number of candidate intra prediction modes, the information being as a parameter of various data unit levels such as a picture parameter set (PPS), a slice parameter set (SPS), a largest coding unit level, a coding unit level, a prediction unit level, and the like according to a level of the data unit updating the number of the candidate intra prediction modes. However, even if the number of candidate intra prediction modes is determined for every data unit, the information representing the number of candidate intra prediction modes is not always encoded.

Figure 8:
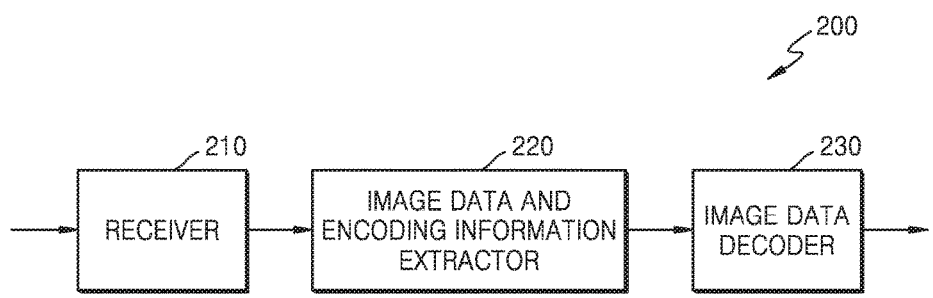
FIG. 8 illustrates a block diagram of a video decoding apparatus based on coding units of a tree structure, according to an embodiment of the present invention.

FIG. 8 illustrates a block diagram of a video decoding apparatus based on coding units of a tree structure 200, according to an embodiment of the present invention.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various types of encoding mode information for decoding operations by the video decoding apparatus 200 according to the embodiment are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a coded depth and encoding mode information about the coding units having a tree structure according to each largest coding unit. The extracted coded depth and the extracted encoding mode information are output to the image data decoder 230. That is, the image data in a bit stream is split into the largest coding unit so that the image data decoder 230 may decode the image data for each largest coding unit.

A coded depth and encoding mode information according to each of the largest coding units may be set for one or more pieces of coded depth information, and encoding mode information according to coded depths may include partition type information of a corresponding coding unit, prediction mode information, and transformation unit size information. Also, as the coded depth information, the split information according to depths may be extracted.

The coded depth and the encoding mode information according to each of the largest coding units extracted by the image data and encoding information extractor 220 are a coded depth and encoding mode determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the coded depth and the encoding mode information according to the predetermined data units. If a coded depth and encoding mode information of a corresponding largest coding unit are recorded according to each of the predetermined data units, predetermined data units having the same coded depth and the encoding mode information may be inferred to be the data units included in the same largest coding unit.

The image data decoder 230 reconstructs the current picture by decoding the image data in each largest coding unit based on the coded depth and the encoding mode information according to each of the largest coding units. That is, the image data decoder 230 may decode the encoded image data, based on a read partition type, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to coded depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a coded depth of a current largest coding unit by using split information according to depths. If the split information specifies that image data is no longer split in the current depth, the current depth is a coded depth. Accordingly, the image data decoder 230 may decode the image data of the current largest coding unit by using the information about the partition type of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the video decoding apparatus 200 of FIG. 8 may perform operations of the video decoding apparatus 20 described above with reference to FIG. 2.

The image data decoder 230 may perform operations of the candidate intra prediction mode determiner 22 and the intra prediction unit 24 of the video decoding apparatus 20.

When the prediction unit for the intra prediction is determined according to each of the coding units having the tree structure, the image data decoder 230 may parse, from a bitstream, intra prediction data for predicting the intra prediction mode for every prediction unit. The image data and encoding information extractor 220 may finish the parsing of the block symbols including the intra prediction data and then may reconstruct the current intra prediction mode from the parsed information. An intra prediction mode of the current block may be predicted by using the plurality of candidate intra prediction modes, the number of which is fixed. The image data decoder 230 may perform the intra prediction on the current prediction unit by using the reconstructed current intra prediction mode and the residual data.

The image data decoder 230 may determine a reference intra prediction mode, based on availability and a prediction mode of a neighboring block of a current block. The image data decoder 230 may determine a plurality of candidate intra prediction modes for the current block, based on the reference intra prediction mode. The image data decoder 230 may determine an intra prediction mode of the current block, based on intra prediction data including information regarding the intra prediction mode of the current block, the information obtained from a bitstream. In more detail, the image data decoder 230 may determine the intra prediction mode of the current block by entropy decoding the intra prediction data.

The image data and encoding information extractor 220 may re-determine the number of the candidate intra prediction modes for every picture.

The image data and encoding information extractor 220 may parse the information representing the number of the candidate intra prediction modes, the number of which is fixed, from the parameters of various data unit levels such as the PPS of the bitstream, the SPS, the maximum coding unit level, the coding unit level, and the prediction unit level. In this case, the image data and encoding information extractor 220 may determine the candidate intra prediction modes by as many as the number represented by the parsed information for every data unit corresponding to the level from which the information is parsed.

However, the image data and encoding information extractor 220 may update the number of candidate intra prediction modes for every slice, the maximum coding unit, the coding unit, or the prediction unit even when the information representing the number of candidate intra prediction modes is not parsed.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal encoding mode information received from an encoding terminal.

Figure 9:
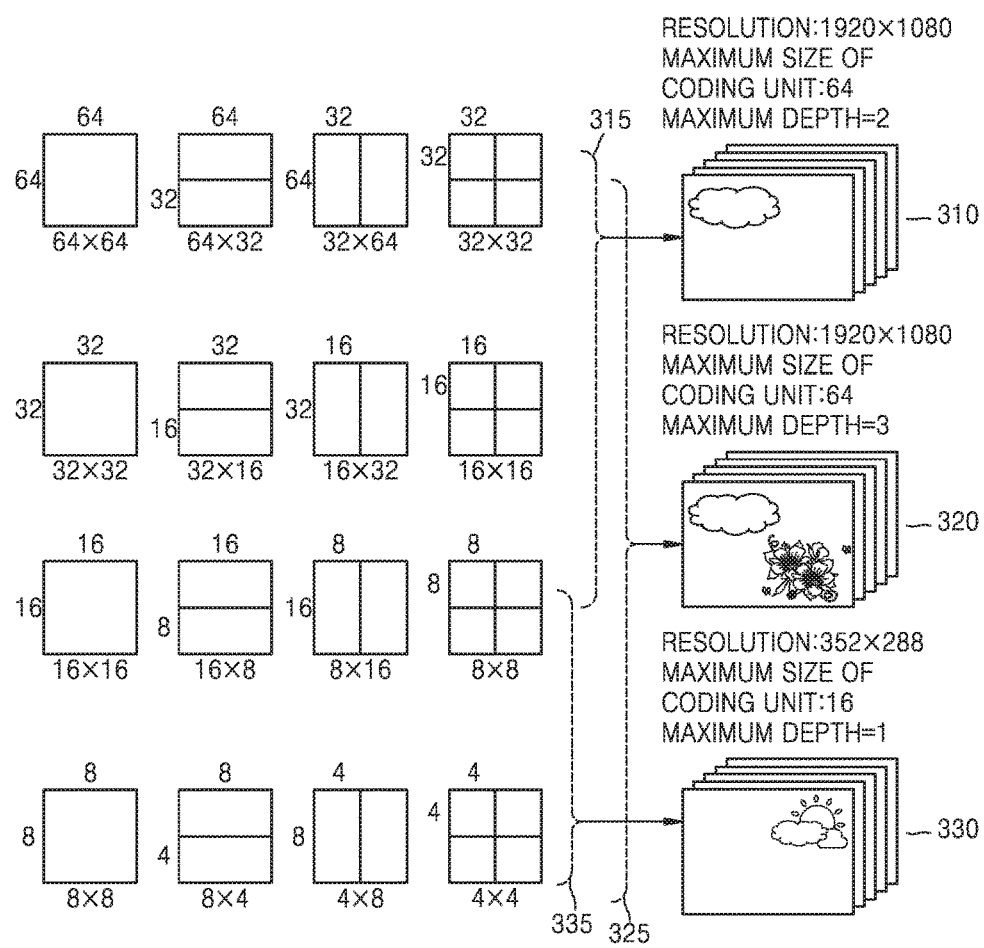
FIG. 9 illustrates a concept of coding units, according to an embodiment of the present invention.

FIG. 9 illustrates a concept of coding units, according to an embodiment of the present invention.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 10:
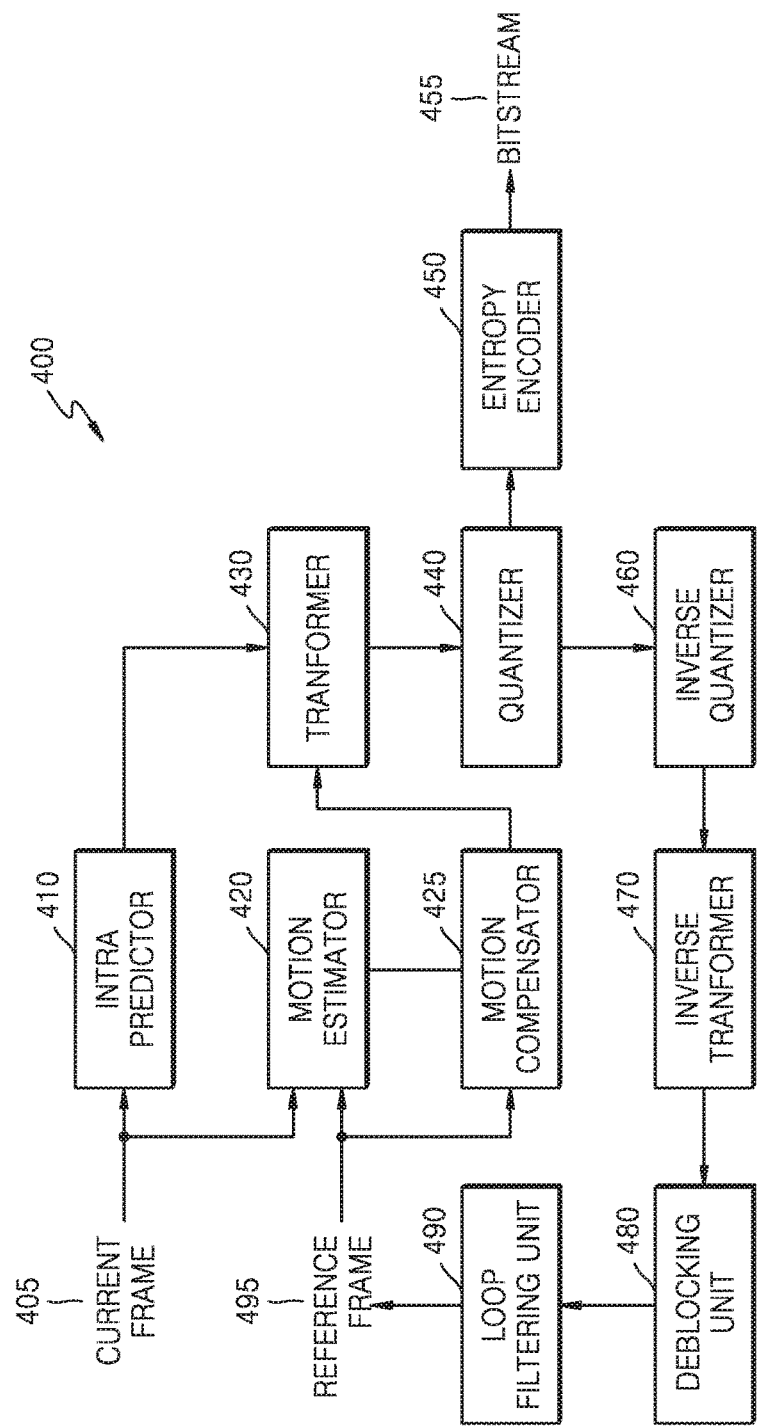
FIG. 10 illustrates a block diagram of an image encoder based on coding units, according to an embodiment of the present invention.

FIG. 10 illustrates a block diagram of an image encoder 400 based on coding units, according to an embodiment of the present invention.

The image encoder 400 according to an embodiment includes operations of the coding unit determiner 120 of the video encoding apparatus 100 so as to encode image data. That is, an intra predictor 410 performs intra prediction on coding units in an intra mode, the coding units being from among a current frame 405, and a motion estimator 420 and a motion compensator 425 perform inter prediction and motion compensation by using the current frame 405 in an inter mode and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse-quantizer 460 and an inverse-transformer 470, and the reconstructed data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100 according to an embodiment, all elements of the image encoder 400, i.e., the intra predictor 410, the motion estimator 420, the motion compensator 425, the transformer 430, the quantizer 440, the entropy encoder 450, the inverse-quantizer 460, the inverse-transformer 470, the deblocking unit 480, and the loop filtering unit 490 have to perform operations based on each coding unit from among coding units having a tree structure while considering the maximum depth of each largest coding unit.

In particular, the intra predictor 410, the motion estimator 420, and the motion compensator 425 determine partitions and a prediction mode of each coding unit from among the coding units having a tree structure while considering the maximum size and the maximum depth of a current largest coding unit, and the transformer 430 has to determine the size of the transformation unit in each coding unit from among the coding units having a tree structure.

In particular, the intra predictor 410 may determine a prediction unit for intra prediction, according to each of coding units having a tree structure in each largest coding unit, and may determine an optimal intra prediction unit for each prediction unit according to rate-distortion optimization. Afterward, the intra predictor 410 may perform intra prediction on each prediction unit.

The entropy encoder 450 may determine a candidate intra prediction mode of each prediction unit determined by the intra predictor 410, and may encode intra prediction data by using a candidate intra prediction unit.

Figure 11:
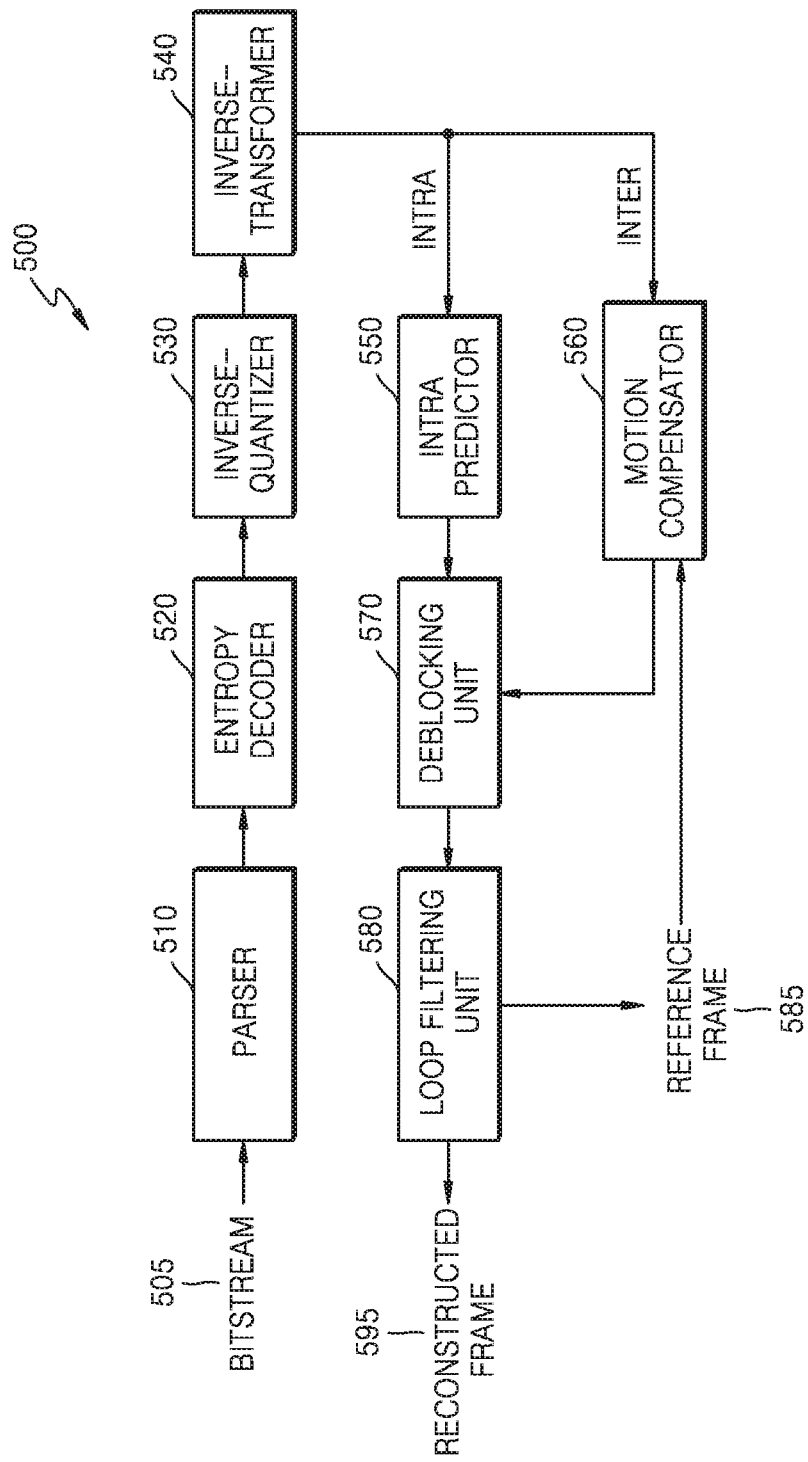
FIG. 11 illustrates a block diagram of an image decoder based on coding units, according to an embodiment of the present invention.

FIG. 11 illustrates a block diagram of an image decoder 500 based on coding units, according to an embodiment of the present invention.

A parser 510 parses encoded image data to be decoded and information about encoding required for decoding from a bitstream 505. The encoded image data is output as inverse quantized data through an entropy decoder 520 and an inverse-quantizer 530, and the inverse quantized data is reconstructed to image data in a spatial domain through an inverse-transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a reconstructed frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations on parsed symbols after the parser 510.

In order for the image decoder 500 to be applied in the video decoding apparatus 200, all elements of the image decoder 500, i.e., the parser 510, the entropy decoder 520, the inverse-quantizer 530, the inverse-transformer 540, the intra predictor 550, the motion compensator 560, the deblocking unit 570, and the loop filtering unit 580 perform operations based on coding units having a tree structure for each largest coding unit.

In particular, the intra predictor 550 and the motion compensator 560 have to determine partitions and a prediction mode for each of the coding units having a tree structure, and the inverse-transformer 540 has to determine a size of a transformation unit for each coding unit.

In particular, when a prediction unit for intra prediction is determined according to each of the coding units having a tree structure, the parser 510 may parse, from a bitstream, intra prediction data for prediction in an intra prediction mode according to each prediction unit. The entropy decoder 520 finishes the parsing of the block symbols including the intra prediction data, and may reconstruct an intra prediction mode of a current prediction unit from the parsed information. The intra predictor 550 may perform the intra prediction on the current prediction unit by using the reconstructed current intra prediction mode and the residual data.

Figure 12:
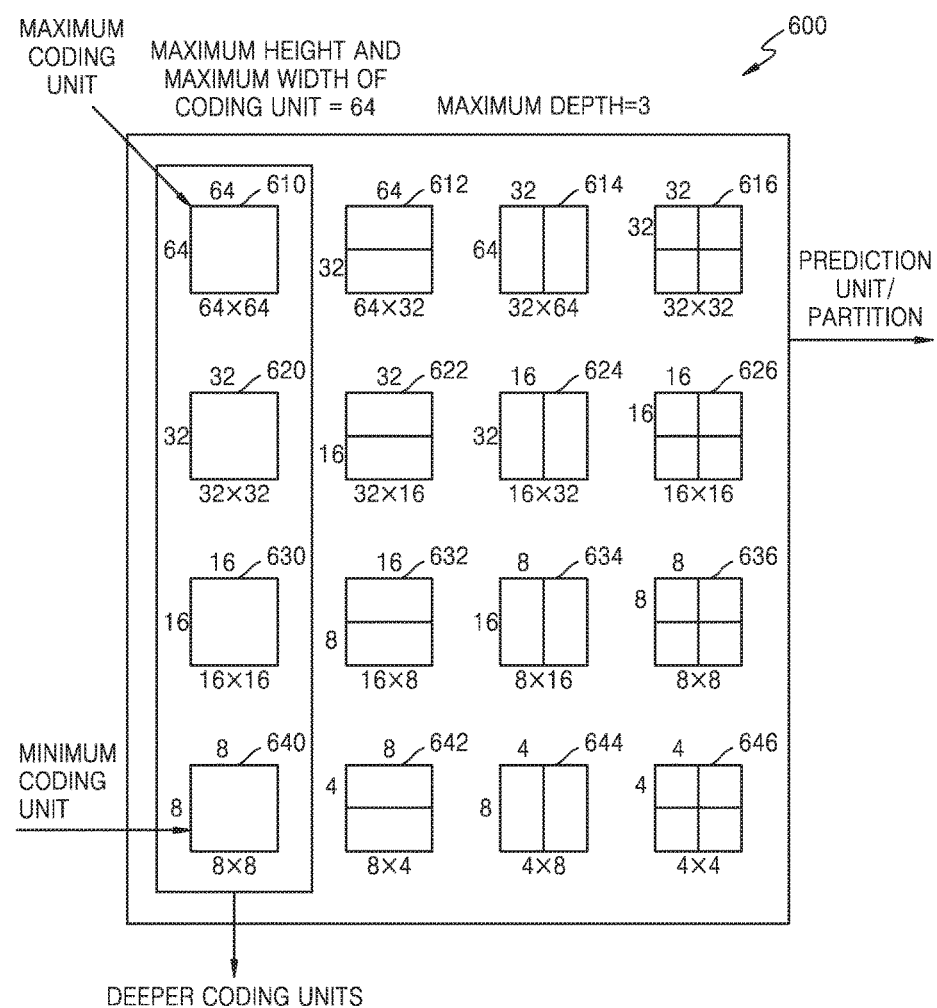
FIG. 12 illustrates deeper coding units according to depths, and partitions, according to an embodiment of the present invention.

FIG. 12 illustrates deeper coding units according to depths, and partitions, according to an embodiment of the present invention.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 4. In this case, the maximum depth represents a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having the size of 32×16, partitions 624 having a size of 16×32, and partitions 626 having the size of 16×16.

Equally, a prediction unit of the coding unit 630 having the size of 16×16 and the depth of 2 may be split into partitions included in the coding unit 630 having the size of 16×16, i.e. a partition 630 having a size of 16×16, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition 640 having a size of 8×8, partitions 642 having a size of 8×4, partitions 644 having a size of 4×8, and partitions 646 having a size of 4×4.

The coding unit 650 having the size of 4×4 and the depth of 4 is the smallest coding unit and a coding unit of the lowermost depth, and a prediction unit of the coding unit 650 may be set only to a partition 650 having a size of 4×4.

In order to determine a coded depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a coded depth and a partition type of the largest coding unit 610.

Figure 13:
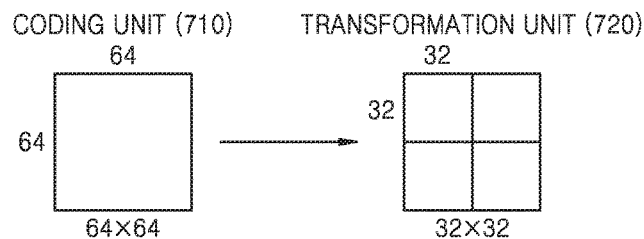
FIG. 13 illustrates a relationship between a coding unit and transformation units, according to an embodiment of the present invention.

FIG. 13 illustrates a relationship between a coding unit and transformation units, according to an embodiment of the present invention.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 14:
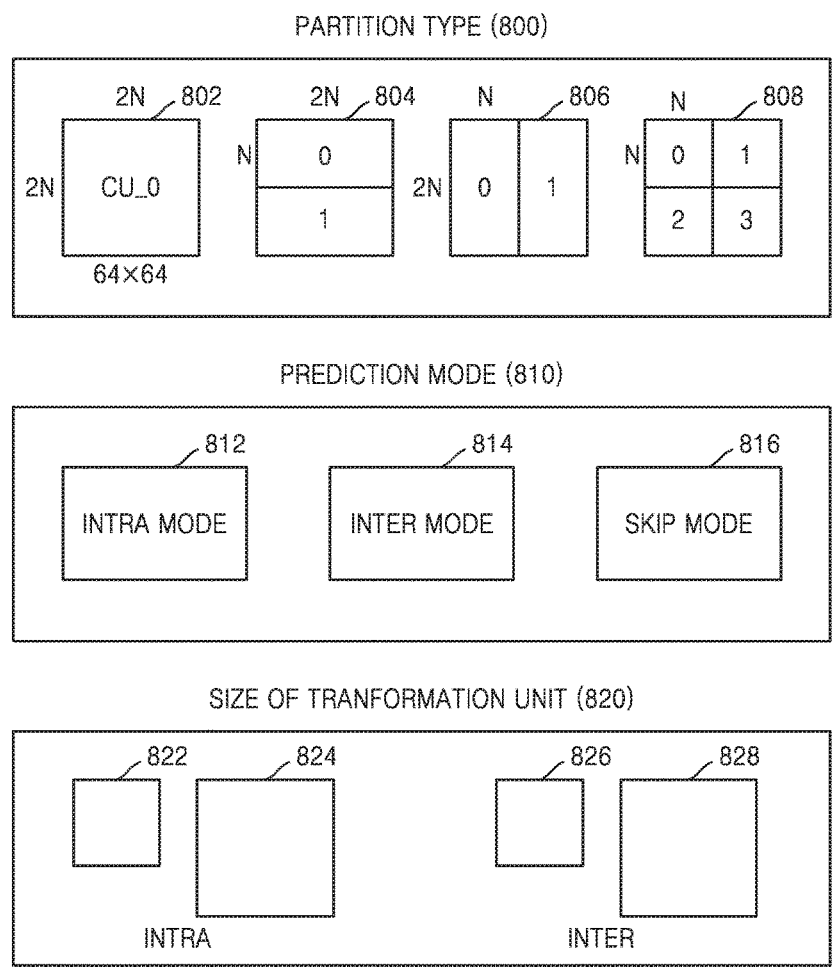
FIG. 14 illustrates a plurality of pieces of encoding information according to depths, according to an embodiment of the present invention.

FIG. 14 illustrates a plurality of pieces of encoding information according to depths, according to an embodiment of the present invention.

The output unit 130 of the video encoding apparatus 100 according to an embodiment may encode and transmit, as encoding mode information, partition type information 800, prediction mode information 810, and transformation unit size information 820 for each coding unit corresponding to a coded depth.

The partition type information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition type information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition type information 800, i.e., an intra mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second inter transformation unit 828.

The image data and encoding information extractor 210 of the video decoding apparatus 200 may extract and use the partition type information 800, the prediction mode information 810, and the transformation unit size information 820 for decoding, according to each deeper coding unit.

Figure 15:
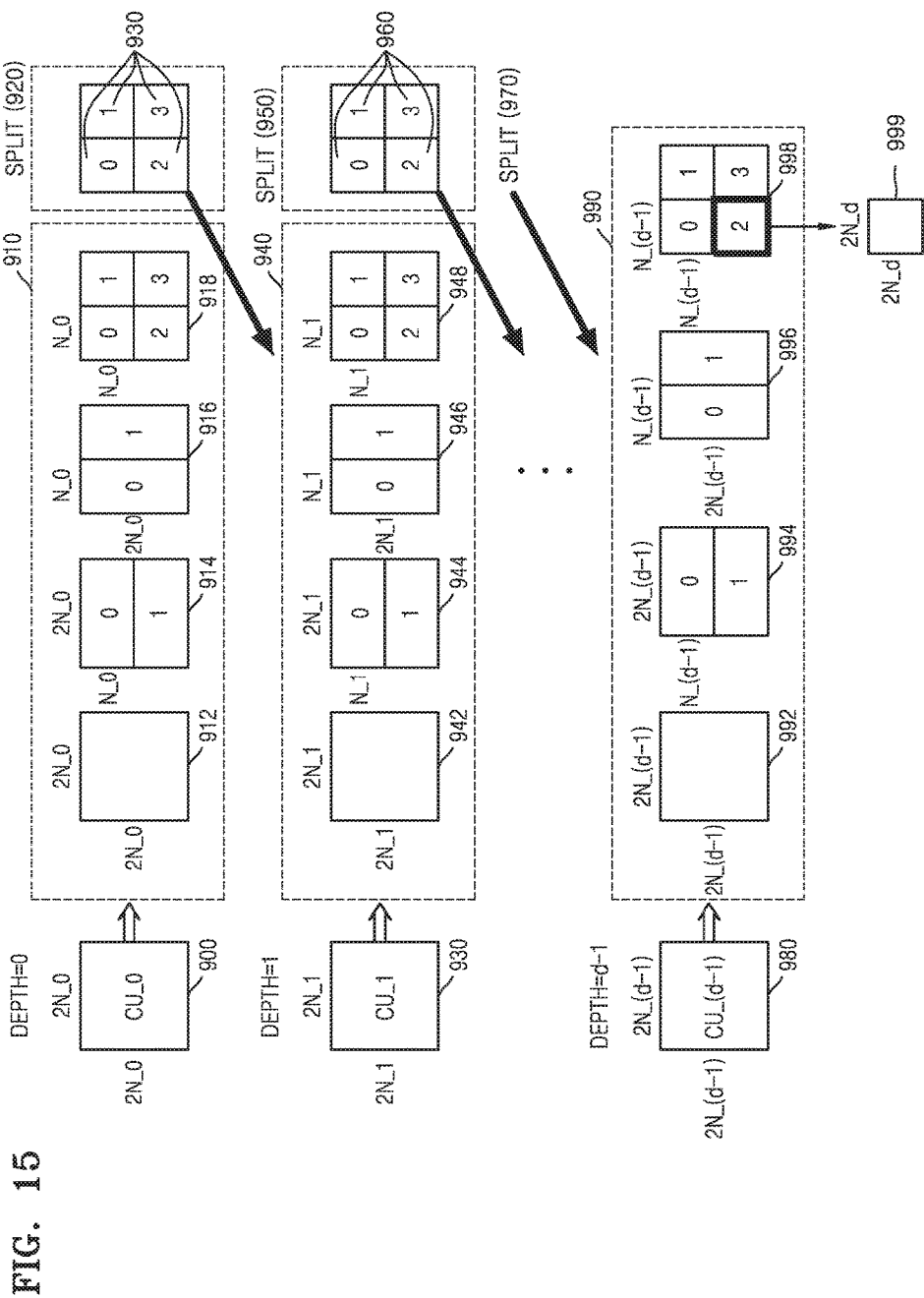
FIG. 15 illustrates deeper coding units according to depths, according to an embodiment of the present invention.

FIG. 15 illustrates deeper coding units according to depths, according to an embodiment of the present invention.

Split information may be used to represent a change in a depth. The spilt information specifies whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. Only the partition types 912, 914, 916, and 918 which are obtained by symmetrically splitting the prediction unit are illustrated, but as described above, a partition type is not limited thereto and may include asymmetrical partitions, partitions having a predetermined shape, and partitions having a geometrical shape.

According to each partition type, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912, 914, and 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 and split is performed (operation 920), and encoding may be repeatedly performed on coding units 930 of a partition type having a depth of 2 and a size of N_0×N_0 so as to search for a minimum encoding error.

A prediction unit 930 for prediction encoding the coding unit 930 having a depth of 1 and a size of 2N_1×2N_1 (=N_0×N_0) may include a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)× 2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types so as to search for a partition type generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current largest coding unit 900 is determined to be d−1 and a partition type of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost coded depth by 4. By performing the encoding repeatedly, the video encoding apparatus 100 according to the embodiment may select a depth having the least encoding error by comparing encoding errors according to depths of the coding unit 900 to determine a coded depth, and may set a corresponding partition type and a prediction mode as an encoding mode of the coded depth.

As such, the minimum encoding errors according to depths are compared in all of the depths of 0, 1, . . . , d−1, d, and a depth having the least encoding error may be determined as a coded depth. The coded depth, and the partition type and the prediction mode of the prediction unit may be encoded and transmitted as encoding mode information. Also, since a coding unit has to be split from a depth of 0 to a coded depth, only split information of the coded depth is set to '0', and split information of depths excluding the coded depth is set to '1'.

The image data and encoding information extractor 220 of the video decoding apparatus 200 according to the embodiment may extract and use a coded depth and prediction unit information about the coding unit 900 so as to decode the coding unit 912. The video decoding apparatus 200 according to the embodiment may determine a depth, in which split information is '0', as a coded depth by using encoding mode information according to depths, and may use, for decoding, encoding mode information about the corresponding depth.

Figure 16:
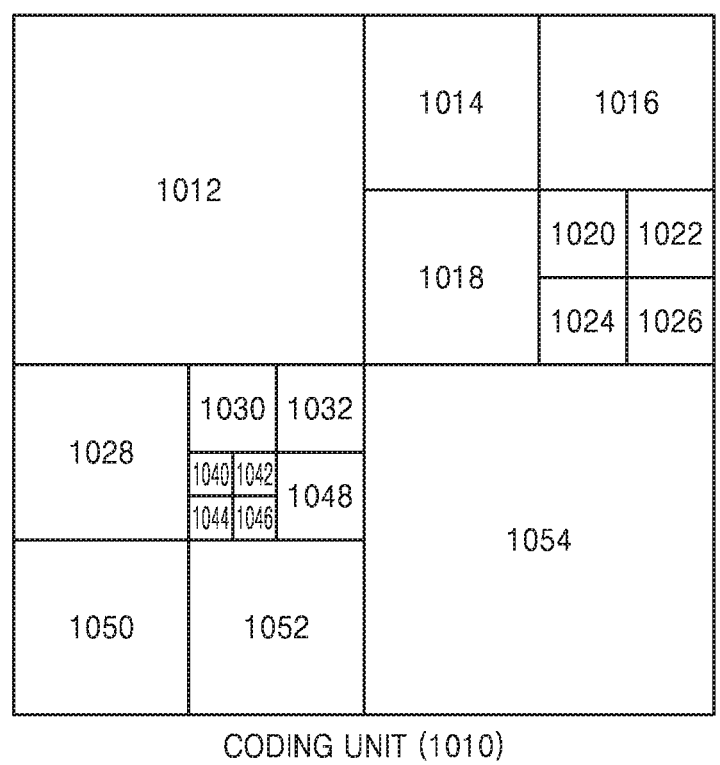
FIGS. 16, 17, and 18 illustrate a relationship between coding units, prediction units, and transformation units, according to an embodiment of the present invention.
Figure 17:
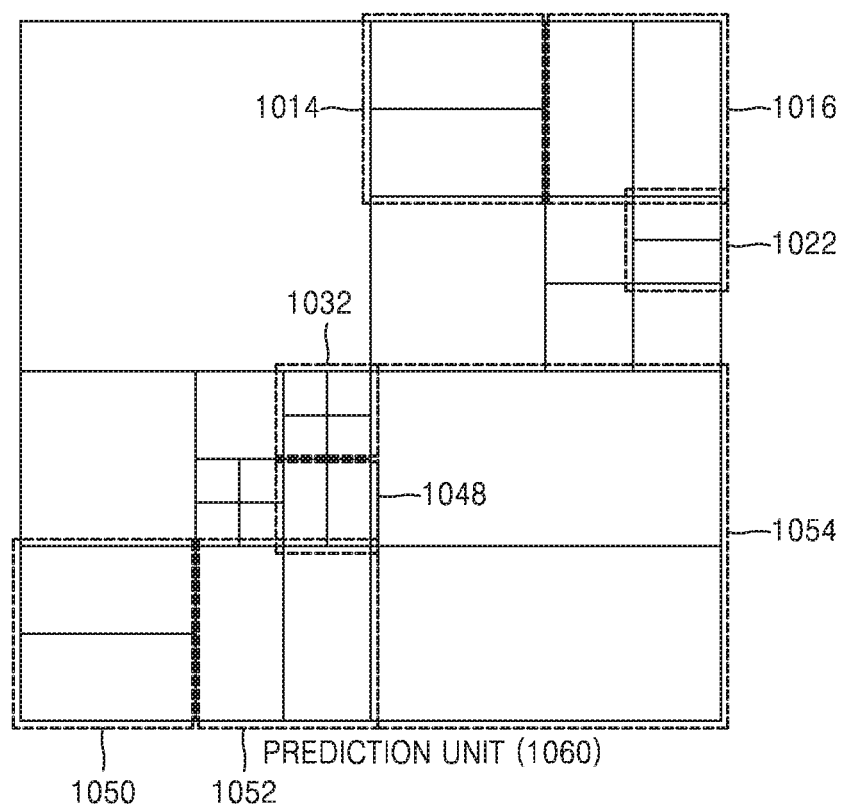
Figure 18:
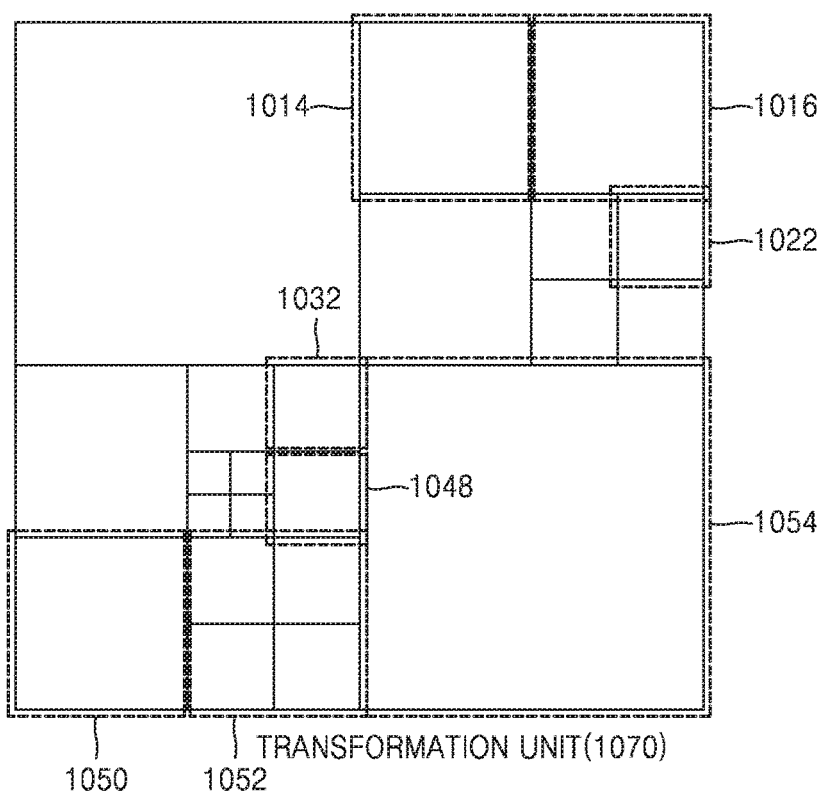

FIGS. 16, 17, and 18 illustrate a relationship between coding units, prediction units, and transformation units, according to an embodiment of the present invention.

Coding units 1010 are deeper coding units according to coded depths determined by the video encoding apparatus 100, in a largest coding unit. Prediction units 1060 are partitions of prediction units of each of the coding units 1010 according to coded depths, and transformation units 1070 are transformation units of each of the coding units according to coded depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition type having a size of 2N×N, partitions 1016, 1048, and 1052 are a partition type having a size of N×2N, and a partition 1032 is a partition type having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1060 are data units different from those in the prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition type information, prediction mode information, and transformation unit size information. Table 4 below shows the encoding information that may be set by the video encoding apparatus 100 and the video decoding apparatus 200 according to the embodiments.

TABLE 4

Split Information 0
(Encoding on Coding Unit having Size of 2N × 2N and Current Depth of d)

| | | | Size of Transformation Unit | | |
|---|---|---|---|---|---|
| Prediction Mode | Partition Type | | Split Information 0 of Transformation Unit | Split Information 1 of Transformation Unit | Split Information 1 |
| | Symmetrical Partition Type | Asymmetrical Partition Type | | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a coded depth, and thus partition type information, prediction mode information, and transformation unit size information may be defined for the coded depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to the embodiment may be assigned to at least one of a coding unit of a coded depth, a prediction unit, and a minimum unit. The coding unit of the coded depth may include at least one of a prediction unit and a minimum unit containing the same encoding information.

Accordingly, it may be determined whether adjacent data units are included in the same coding unit corresponding to the coded depth by comparing encoding information of the adjacent data units. Also, a coding unit of a corresponding coded depth may be determined by using encoding information of a data unit, thus, a distribution of coded depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 19:
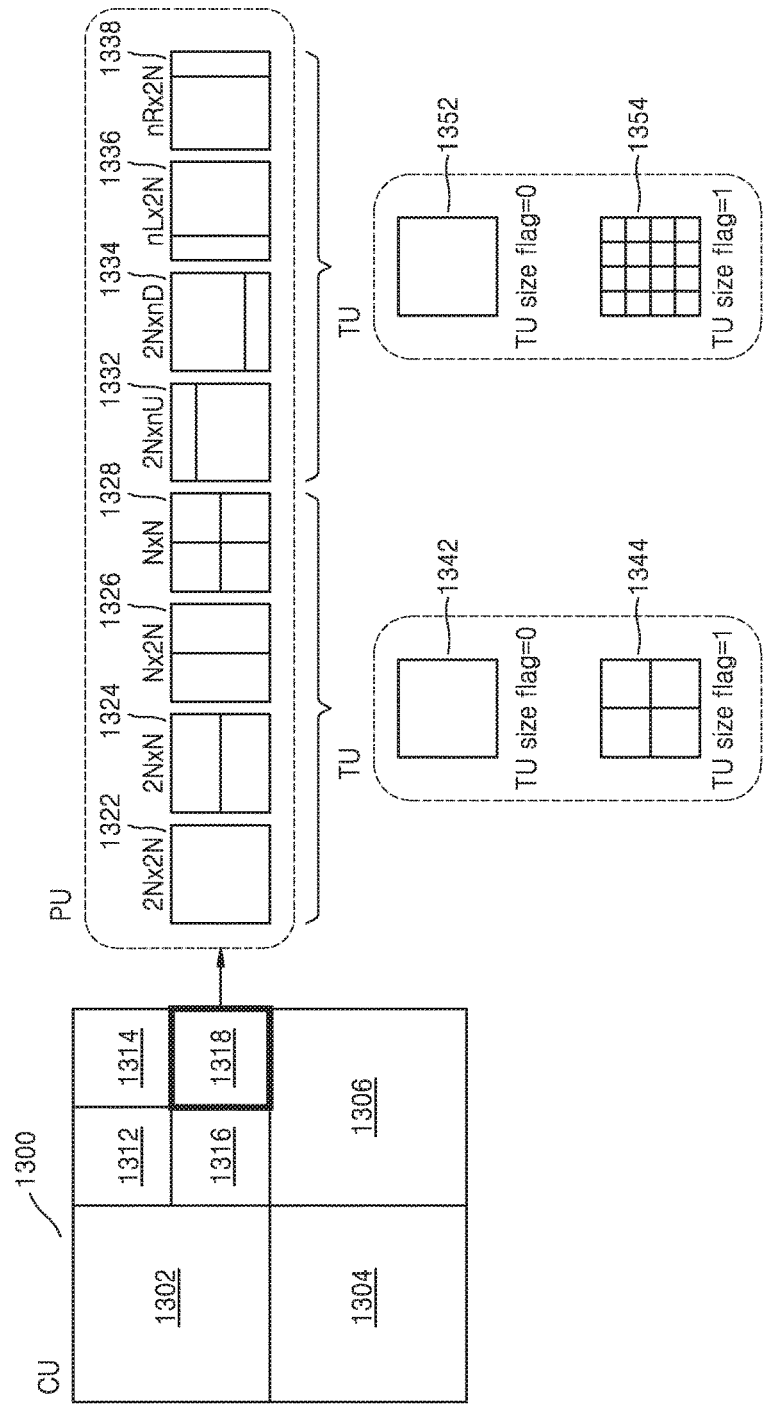
FIG. 19 illustrates a relationship between a coding unit, a prediction unit, and a transformation unit, according to encoding mode information of Table 4.

FIG. 19 illustrates a relationship between a coding unit, a prediction unit, and a transformation unit, according to the encoding mode information of Table 4.

A largest coding unit 1300 includes coding units 1302, 1304, 1306, 1312, 1314, 1316, and 1318 of coded depths. Here, since the coding unit 1318 is a coding unit of a coded depth, split information may be set to 0. Partition type information of the coding unit 1318 having a size of 2N×2N may be set to be one of partition types including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition type of the coding unit.

For example, when the partition type information is set to be one of symmetrical partition types 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition type information is set to be one of asymmetrical partition types 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize=max(MinTransformSize,RootTuSize/(2^{\wedge}MaxTransformSizeIndex)) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=min(MaxTransformSize,PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=min(MaxTransformSize,PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 7 through 19, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The aforementioned embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope of the following claims. The disclosed embodiments should be considered in a descriptive sense only and not for purposes of limitation. Therefore, the scope of the present invention is defined not by the detailed description of the present invention but by the appended claims, and all differences within the scope will be construed as being included in the present invention.

The invention claimed is:

1. A video decoding method comprising:
    determining reference intra prediction modes, based on availability and prediction modes of adjacent blocks of a current block;
    determining candidate intra prediction modes for the current block, based on the reference intra prediction mode;
    obtaining, from a bitstream, candidate intra prediction flag indicating whether one of the candidate intra prediction modes is selected as an intra prediction mode of the current block;
    when the candidate intra prediction flag indicates that one of the candidate intra prediction modes is selected as the intra prediction mode of the current block, obtaining, from the bitstream, current intra prediction information indicating the intra prediction mode of the current block from among the candidate intra prediction modes; and
    selecting the intra prediction mode of the current block from among the candidate intra prediction modes according to the current intra prediction information; and
    performing intra prediction on the current block, according to the intra prediction mode of the current block,
    wherein,
    the determining the reference intra prediction modes includes:
        determining a first intra prediction mode of the current block based on a left adjacent block of the current block; and
        determining a second intra prediction mode of the current block based on an upper adjacent block of the current block, and
    the determining the candidate intra prediction modes includes:
        determining a bilinear mode and a DC mode as the candidate intra prediction modes, where the first intra prediction mode and the second intra prediction mode are identical and the first intra prediction mode is the DC mode, determining the first intra prediction mode and the DC mode as the candidate intra prediction modes, where the first intra prediction mode and the second intra prediction mode are identical and the first intra prediction mode is not the DC mode.

2. The video decoding method of claim 1, wherein
the reference intra prediction mode comprises the first reference intra prediction mode and the second reference intra prediction mode, wherein the first reference intra prediction mode is determined based on availability and a prediction mode of the left adjacent block of the current block, and the second reference intra prediction mode is determined based on availability and a prediction mode of the above adjacent block of the current block, and
the determining of the reference intra prediction mode comprises
when the left adjacent block of the current block is not present or the left adjacent block of the current block is predicted based on inter prediction, determining the first reference intra prediction mode as the DC mode,
when the left adjacent block of the current block is predicted based on intra prediction, determining the first reference intra prediction mode as an intra prediction mode of the left adjacent block of the current block,
when the above adjacent block of the current block is not present or the above adjacent block of the current block is predicted based on inter prediction, determining the second reference intra prediction mode as the DC mode, and
when the above adjacent block of the current block is predicted based on intra prediction, determining the second reference intra prediction mode as an intra prediction mode of the above adjacent block of the current block.

3. The video decoding method of claim 2, wherein, when the first reference intra prediction mode and the second reference intra prediction mode are different,
the determining of the candidate intra prediction modes comprises
determining a first candidate intra prediction mode as an intra prediction mode having a smaller index value among the candidate intra prediction modes, and
determining a second candidate intra prediction mode as an intra prediction mode having a larger index value among the candidate intra prediction modes.

4. A video decoding apparatus comprising:
a candidate intra prediction mode determiner configured to
determine reference intra prediction modes, based on availability and prediction modes of adjacent blocks of a current block, and
determine candidate intra prediction modes for the current block, based on the reference intra prediction mode; and
an intra predictor configured to
obtain, from a bitstream, candidate intra prediction flag indicating whether one of the candidate intra prediction modes is selected as an intra prediction mode of the current block, when the candidate intra prediction flag indicates that one of the candidate intra prediction modes is selected as the intra prediction mode of the current block, obtaining, from the bitstream, current intra prediction information indicating the intra prediction mode of the current block from among the candidate intra prediction modes,
select the intra prediction mode of the current block, from among the candidate intra prediction modes according to the current intra prediction information, and
perform intra prediction on the current block, according to the intra prediction mode of the current block,
wherein,
the determining the reference intra prediction modes includes:
determining a first intra prediction mode of the current block based on a left adjacent block of the current block; and
determining a second intra prediction mode of the current block based on an upper adjacent block of the current block, and
the determining the candidate intra prediction modes includes:
determining a bilinear mode and a DC mode as the candidate intra prediction modes, where the first intra prediction mode and the second intra prediction mode are identical and the first intra prediction mode is the DC mode,
determining the first intra prediction mode and the DC mode as the candidate intra prediction modes, where the first intra prediction mode and the second intra prediction mode are identical and the first intra prediction mode is not the DC mode.

5. The video decoding apparatus of claim 4, wherein
the reference intra prediction mode comprises the first reference intra prediction mode and the second reference intra prediction mode, wherein the first reference intra prediction mode is determined based on availability and a prediction mode of the left adjacent block of the current block, and the second reference intra prediction mode is determined based on availability and a prediction mode of the above adjacent block of the current block, and
the candidate intra prediction mode determiner is further configured to
when the left adjacent block of the current block is not present or the left adjacent block of the current block is predicted based on inter prediction, determining the first reference intra prediction mode as the DC mode,
when the left adjacent block of the current block is predicted based on intra prediction, determining the first reference intra prediction mode as an intra prediction mode of the left adjacent block of the current block,
when the above adjacent block of the current block is not present or the above adjacent block of the current block is predicted based on inter prediction, determining the second reference intra prediction mode as the DC mode, and
when the above adjacent block of the current block is predicted based on intra prediction, determining the second reference intra prediction mode as an intra prediction mode of the above adjacent block of the current block.

6. The video decoding apparatus of claim 5, wherein, when the first reference intra prediction mode and the second reference intra prediction mode are different,
the candidate intra prediction mode determiner is further configured to
determine a first candidate intra prediction mode as an intra prediction mode having a smaller index value among the candidate intra prediction modes, and determine a second candidate intra prediction mode as an intra prediction mode having a larger index value among the candidate intra prediction modes.

7. A video encoding method comprising:
- determining reference intra prediction modes, based on availability and prediction modes of adjacent blocks of a current block;
- determining candidate intra prediction modes for the current block, based on the reference intra prediction mode; and
- based on an intra prediction mode of the current block and the plurality of candidate intra prediction modes of the current block, determining candidate intra prediction flag indicating whether the current block is predicted according to one of the candidate intra prediction modes, and current intra prediction information indicating the intra prediction mode of the current block from among the candidate intra prediction modes; and
- outputting a bitstream including the candidate intra prediction flag and the current intra prediction information, wherein,
the determining the reference intra prediction modes includes:
- determining a first intra prediction mode of the current block based on a left adjacent block of the current block; and
- determining a second intra prediction mode of the current block based on an upper adjacent block of the current block, and the determining the candidate intra prediction modes includes:
- determining a bilinear mode and a DC mode as the candidate intra prediction modes, where the first intra prediction mode and the second intra prediction mode are identical and the first intra prediction mode is the DC mode,
- determining the first intra prediction mode and the DC mode as the candidate intra prediction modes, where the first intra prediction mode and the second intra prediction mode are identical and the first intra prediction mode is not the DC mode.

* * * * *